(12) United States Patent
Tsuruta et al.

(10) Patent No.: US 9,376,225 B2
(45) Date of Patent: Jun. 28, 2016

(54) VERTICAL FILLING AND PACKAGING MACHINE AND METHOD OF MANUFACTURING PACKAGING BAG WITH CONTENT

(75) Inventors: Masataka Tsuruta, Takasaki (JP); Akira Yamaguchi, Takasaki (JP); Tsubasa Shintani, Takasaki (JP)

(73) Assignee: ORIHIRO ENGINEERING CO., LTD., Takasaki (JP)

( * ) Notice: Subject to any disclaimer, the term of this patent is extended or adjusted under 35 U.S.C. 154(b) by 1009 days.

(21) Appl. No.: 13/381,597

(22) PCT Filed: Jul. 2, 2009

(86) PCT No.: PCT/JP2009/062135
§ 371 (c)(1),
(2), (4) Date: Mar. 19, 2012

(87) PCT Pub. No.: WO2011/001528
PCT Pub. Date: Jan. 6, 2011

(65) Prior Publication Data
US 2012/0159905 A1 Jun. 28, 2012

(51) Int. Cl.
*B65B 9/10* (2006.01)
*B65B 9/20* (2012.01)
(Continued)

(52) U.S. Cl.
CPC . *B65B 9/20* (2013.01); *B29C 65/18* (2013.01); *B29C 65/305* (2013.01);
(Continued)

(58) Field of Classification Search
CPC ............. B65B 9/20–9/22; B65B 9/073; B65B 2220/12; B65H 2301/512422; B65H 23/02; B29C 66/7451; B29C 66/1122; B29C 66/133; B29C 66/244; B29C 66/431; B29C 66/4312; B29C 66/432; B29C 66/81422; B29C 66/81435; B29C 66/8322; B29C 66/8491; B29C 65/18; B29C 65/305; B29C 65/7451
USPC ........... 53/450–460, 547, 548, 550–552, 556, 53/557, 133.1–133.4, 373.6
See application file for complete search history.

(56) References Cited

U.S. PATENT DOCUMENTS 4,118,913 A * 10/1978 Putnam et al. .................. 53/551
4,709,532 A * 12/1987 Taylor ............................. 53/451
(Continued)

FOREIGN PATENT DOCUMENTS

DE 8905616 U1 7/1989
DE 3807949 A1 9/1989
(Continued)

OTHER PUBLICATIONS

Search Report issued Oct. 11, 2012 in corresponding European Application No. 09846821.8.

*Primary Examiner* — Stephen F Gerrity
*Assistant Examiner* — Joshua Kotis
(74) *Attorney, Agent, or Firm* — Knobbe Martens Olson & Bear LLP

(57) ABSTRACT

A vertical filling and packaging machine of the present invention includes tension devices (11) that are disposed near positions of ironing rollers (5) and that pull both sides of cylindrical film (1) laterally outward. Tension devices (11) pull both sides of cylindrical film (1) laterally outward to flatten a portion of cylindrical film (1) before the pair of ironing rollers (5) sandwiches the portion of cylindrical film (1), wherein the content has been injected into the cylindrical film (1). As a result, when lateral seal part (1e) is formed on cylindrical film (1) by lateral seal device (6), lateral seal part (1e) is not easily wrinkled.

12 Claims, 16 Drawing Sheets

(51) Int. Cl.
  *B29C 65/18* (2006.01)
  *B29C 65/74* (2006.01)
  *B29C 65/00* (2006.01)
  *B65H 23/02* (2006.01)
  *B29C 65/30* (2006.01)

(52) U.S. Cl.
  CPC ........ *B29C 65/7451* (2013.01); *B29C 66/1122* (2013.01); *B29C 66/133* (2013.01); *B29C 66/244* (2013.01); *B29C 66/431* (2013.01); *B29C 66/432* (2013.01); *B29C 66/4312* (2013.01); *B29C 66/4322* (2013.01); *B29C 66/81422* (2013.01); *B29C 66/81427* (2013.01); *B29C 66/8322* (2013.01); *B29C 66/8491* (2013.01); *B65B 9/2007* (2013.01); *B65B 9/2042* (2013.01); *B65H 23/02* (2013.01); *B29C 66/81435* (2013.01); *B65H 2301/512422* (2013.01); *B65H 2701/191* (2013.01); *B65H 2801/69* (2013.01)

(56) References Cited

U.S. PATENT DOCUMENTS

| | | | | |
|---|---|---|---|---|
| 4,869,048 A | | 9/1989 | Boeckmann | |
| 4,924,656 A | * | 5/1990 | Kovacs et al. | 53/436 |
| 5,067,310 A | * | 11/1991 | Yamanaka | 53/551 |
| 5,125,217 A | * | 6/1992 | Fukuda | 53/551 |
| 5,170,609 A | * | 12/1992 | Bullock et al. | 53/434 |
| 5,463,851 A | * | 11/1995 | Nagai | 53/552 |
| 5,930,983 A | * | 8/1999 | Terminella et al. | 53/436 |
| 6,145,282 A | * | 11/2000 | Tsuruta | 53/551 |
| 6,182,426 B1 | * | 2/2001 | Pritchard | 53/551 |
| 6,212,861 B1 | * | 4/2001 | Tsuruta | 53/551 |
| 6,729,108 B2 | * | 5/2004 | Tsuruta | 53/451 |
| 7,325,378 B2 | * | 2/2008 | Ausnit | 53/412 |

FOREIGN PATENT DOCUMENTS

| | | | | |
|---|---|---|---|---|
| EP | 0917946 | A2 | 5/1999 | |
| EP | 1228964 | A1 | 7/2002 | |
| EP | 1241121 | A1 | 9/2002 | |
| EP | 1241121 | B1 * | 9/2002 | ........... B65H 23/025 |
| EP | 1241121 | B1 * | 11/2003 | |
| JP | 62-158631 | A | 7/1987 | |
| JP | 62-132909 | U | 8/1987 | |
| JP | 2000-062708 | A | 2/2000 | |
| JP | 2001-504783 | A | 4/2001 | |
| JP | 2002-234504 | A | 8/2002 | |
| JP | 2006-341854 | A | 12/2006 | |
| JP | 2006341854 | A * | 12/2006 | |
| JP | 2007-106423 | A | 4/2007 | |
| JP | 2007106423 | A * | 4/2007 | |
| JP | 2010-143619 | A | 7/2010 | |
| WO | 98/23488 | A1 | 6/1998 | |
| WO | 2008087710 | A1 | 7/2008 | |

* cited by examiner

PRIOR ART

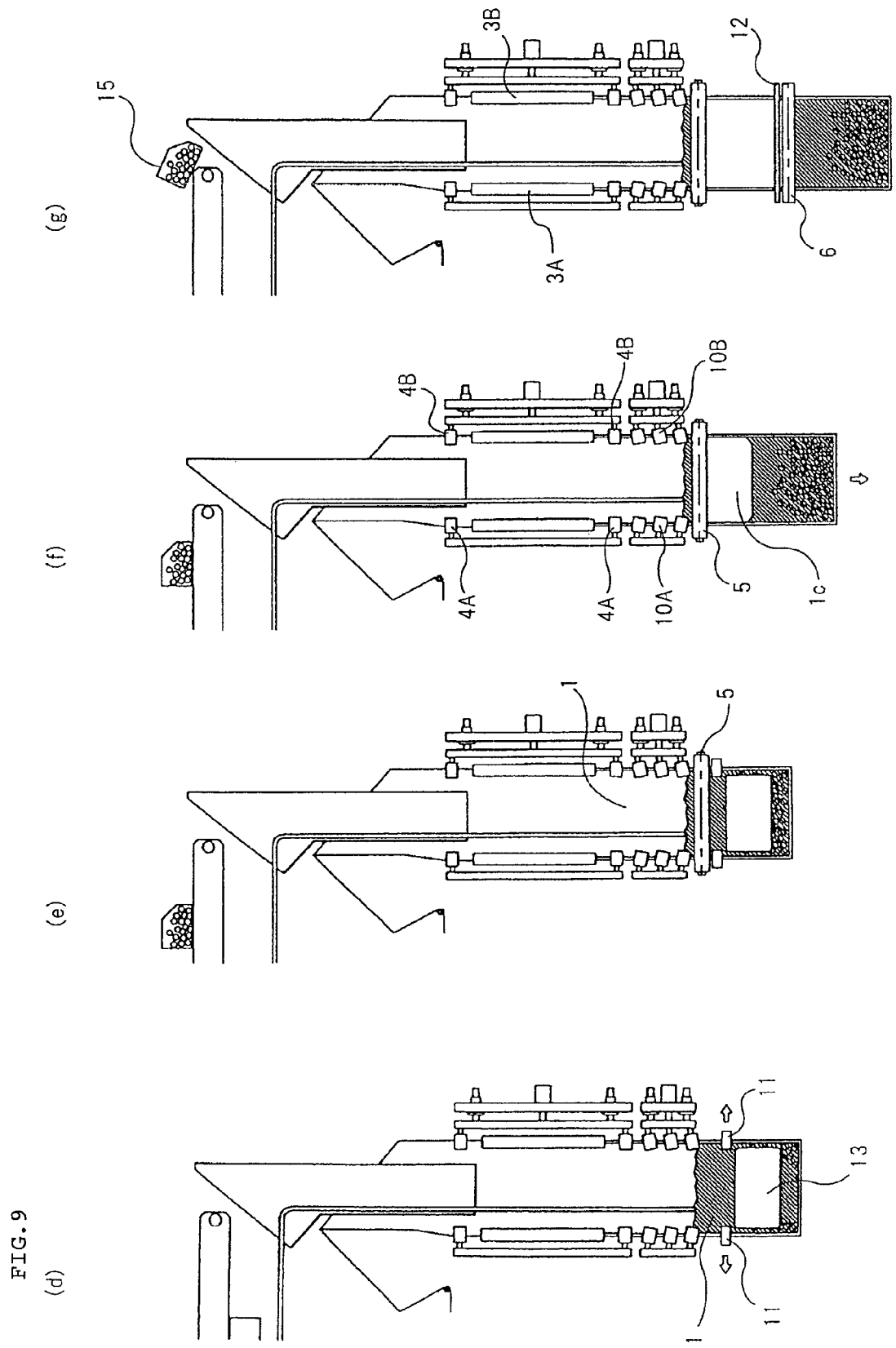

VERTICAL FILLING AND PACKAGING MACHINE AND METHOD OF MANUFACTURING PACKAGING BAG WITH CONTENT

CROSS-REFERENCE TO RELATED APPLICATIONS

This application is the U.S. National Phase under 35. U.S.C. §371 of International Application PCT/JP2009/062135, filed Jul. 2, 2009. The International Application was published under PCT Article 21(2) in a language other than English. The disclosures of the above-described application is hereby incorporated by reference in their entirety

TECHNICAL FIELD

The present invention relates to a vertical filling and packaging machine with which a product can be injected into a packaging bag from above to fill the packaging bag with the product while forming the packaging bag from a film, and to a manufacturing method of a packaging bag with content.

BACKGROUND ART

With a conventional vertical filling and packaging machine, liquid, pasty, or solid content is put in a cylindrical film while forming a film in a cylindrical shape that is fed in a vertical direction, and an upper part and a lower part of the cylindrical film are heat-sealed, whereby an envelope-shaped packaging bag with content is manufactured.

In the vertical filling and packaging machine, there are cases where a cylindrical film is filled with liquid or pasty content (hereinafter referred to as one part filling), where a cylindrical film is filled with liquid content at the same time when solid content is injected into the cylindrical film (hereinafter referred to as two parts filling), or where only solid content is injected into a cylindrical film.

There are included a pillow type, a three-side seal type, a four-side seal type, a standing type, etc. in the forms of packaging bags to be manufactured. All of these types of bags are manufactured in a way such that the width center of a belt-like film extending in a vertical direction is folded to be formed in a cylindrical shape, both of the overlapped sides of this cylindrical film are heat-sealed in a longitudinal direction, and further, each upper part and each lower part of the cylindrical film is heat-sealed in a lateral direction. However, as for the pillow type, a seal part in the longitudinal direction (hereinafter referred to as a vertical seal part) is located in the center of the lateral direction of the packaging bag (refer to FIG. 1a). As for the three-side seal type, the vertical seal part is located only at one end in the lateral direction of the envelope-shaped packaging bag (refer to FIG. 1b). As for the four-side seal type and the standing type, the vertical seal part is located at both ends in the lateral direction of the envelope-shaped packaging bag (refer to FIG. 1c). In particular, as for the standing type, the bottom of the packaging bag is formed so that a four-side seal type packaging bag can be displayed upright.

Here, a conventional vertical filling and packaging machine will be described using an example of manufacturing the four-side seal type envelope-shaped packaging bag. FIG. 2 is a view showing the main part of a conventional vertical filling and packaging machine (four-side seal type).

As shown in FIG. 2, a sheet-like film is fed in a vertical direction, the width direction ends of the sheet-like film overlap with each other by bag-making guide 2, and thereby cylindrical film 1 is formed.

Under bag-making guide 2, arranged are plural vertical seal devices 3 that perform heat-sealing in a longitudinal direction with respect to each folding part and each overlapping part of cylindrically formed film 1.

Plural vertical seal devices 3 are arranged opposed to each other in a state of sandwiching the folding part and the overlapping part of cylindrical film 1 therebetween, and they can move in a direction away from each other and in a direction in contact with each other. These vertical seal devices 3 enable vertical seal part 1d to be formed at both sides of cylindrical film 1.

Above each vertical seal device 3, a pair of guide rollers 4 that rotate sandwiching the sides of cylindrical film 1 to feed cylindrical film 1 downwardly is provided.

Under vertical seal devices 3, a pair of ironing rollers 5 that are arranged opposed to each other sandwiching cylindrical film 1 therebetween, and that are rotated in synchronization with rotations of guide rollers 4 is provided. Ironing rollers 5 separate content injected into cylindrical film 1 by sandwiching the full width in the lateral direction of cylindrical film 1, and they can move in a direction away from each other and in a direction in contact with each other.

Under ironing rollers 5, a pair of lateral seal devices 6 that are arranged opposed to each other sandwiching cylindrical film 1 therebetween, and that form a heat seal part in the lateral direction (hereinafter referred to as lateral seal part 1e) over the full width of cylindrical film 1 is arranged.

Further, injection pipe 7 that injects a product in cylindrical film 1 extends in the vertical direction from an upper side of bag-making guide 2 to right above ironing rollers 5 through an inside of bag-making guide 2.

In the above-mentioned filling and packaging machine, vertical seal part 1d is formed at the both sides of cylindrical film 1, respectively by vertical seal devices 3, lateral seal part 1e is formed in the lateral direction of cylindrical film 1 by lateral seal devices 6, and a product is injected into cylindrical film 1 from injection pipe 7 in a state in which a space between ironing rollers 5 is opening. Subsequently, the space between ironing rollers 5 is closed, and content in cylindrical film 1 is separated in a film feeding direction by ironing rollers 5. When guide rollers 4 and ironing rollers 5 are rotated in this state to feed cylindrical film 1 downwardly, an empty portion without content is formed in cylindrical film 1.

When the empty portion is fed to lateral seal devices 6, the feeding of cylindrical film 1 is stopped, and opposed lateral seal devices 6 are moved closer to each other. As a result, the films sandwiched between lateral seal devices 6 are heat-welded to form a lateral seal part, and as a result, the upper opening of cylindrical film 1 is sealed. Subsequently, when the film is cut off at a portion of the lateral seal part, a four-side seal type envelope-shaped packaging bag with the product can be obtained.

It is to be noted that an exemplary mechanism of a conventional vertical filling and packaging machine is described also in the following Patent Documents 1 and 2.

Consideration is given to using the above-described vertical filling and packaging machine for a manufacturing apparatus for retort pouch food. High airtightness is required for packaging bags in the retort pouch food industry. For that reason, three-side seal type or four-side seal type packaging bags are desirably used instead of pillow type ones in the retort pouch food industry. Since the vertical seal part on the periphery of the bag in the pillow type packaging bag does not have an edge piece, the corners of the content filling portion of the bag easily touch the outside. As a result of this, such problems occur that the corners easily have pinholes, the sharp corners damage other bags, etc., and thus the three-side seal type or the four-side seal type packaging bags are desirably used.

However, there has been a case where the lateral seal part is wrinkled when manufacturing the three-side seal type or the four-side seal type packaging bag with content using the conventional vertical filling and packaging machine. This phenomenon has occurred even though a filling method of the content is the one part filling, the two parts filling, or the solid-only filling one. Such formation of wrinkles leads to poor appearance and reduction of airtightness of the bag. Accordingly, it has been necessary to improve the conventional vertical filling and packaging machine in order that the three-side seal type or the four-side seal type packaging bag with content may have high airtightness.

Here will be described with reference to FIG. 3 the reason why the lateral seal part of the three-side seal type or the four-side seal type packaging bag with content is wrinkled in the conventional vertical filling and packaging machine. FIG. 3 is a schematic view of a cylindrical film fed in a vertical direction when viewed from an upper side of a packaging machine.

For example, when the four-side seal type packaging bag is manufactured by using a conventional vertical filling and packaging machine, after forming cylindrical film 1 by folding a sheet-like film to overlap both sides thereof by a bag-making guide, heat-sealing in a longitudinal direction is carried out on the side of a folding part and the side of an overlapping part of cylindrical film 1. At this time, since it is difficult to completely make the peripheral lengths of surface A equal that of surface B of the film between vertical seal parts 8, strictly speaking, the peripheral lengths of the film surfaces between vertical seal parts 8 slightly differ in front surface A and back surface B as shown in FIG. 3. In addition, since the tip of injection pipe 7 is located right above ironing rollers 5 in cylindrical film 1 in a conventional vertical filling and packaging machine, a portion that is right above ironing rollers 5 of cylindrical film 1 is cylindrically swollen due to injection pipe 7 when the space between ironing rollers 5 is closed.

When cylindrical film 1 that is cylindrically swollen as described above is sandwiched between ironing rollers 5, cylindrical film 1 becomes easily wrinkled in the process of being crushed into a flat shape from the cylindrical shape. In addition, when the peripheral lengths of surface A and surface B between vertical seal parts 8 are different from each other in a state where cylindrical film 1 is cylindrically swollen, the width of the film is restricted by the film surface with the shorter peripheral length in the sandwiching process of cylindrical film 1 in which cylindrical film 1 is sandwiched between ironing rollers 5, and the film surface with the longer peripheral length becomes wrinkled (refer to FIG. 3(c)). The larger the diameter of injection pipe 7, the greater is cylindrical film 1 crushed from a cylindrically swollen state by ironing rollers 5, and thus cylindrical film 1 becomes easily wrinkled. Particularly, when a solid injecting pipe is used as in the two parts filling, it has been difficult to suppress formation of wrinkles since a pipe diameter of the solid injecting pipe is larger than that of a liquid injecting pipe.

In addition, since the vertical seal part is formed only on one side of cylindrical film 1 when the three-side seal type packaging bag is manufactured by using a conventional vertical filling and packaging machine, the films overlapping the other sides are easily misaligned when sandwiched between guide rollers 4. Hence, cylindrical film 1 may become wrinkled at the time when the sandwiching operation of ironing rollers 5 is performed.

In addition, the greater the amount of a product or the heavier the product, which is injected into longitudinally hung cylindrical film 1, the more easily is sag (the wavy portion) formed on surface A and surface B of cylindrical film 1. When cylindrical film 1 is sandwiched between ironing rollers 5 in this state, the wavy portion is crushed, as is, so that it becomes wrinkled.

Due to the above causes, the lateral seal part is formed while wrinkles remain in the packaging bag, such as the three-side seal type and the four-side seal type packaging bags.

CITATION LIST

Patent Documents

Patent Document 1: Japanese Patent Publication No. 2000-62708A
Patent Document 2: Japanese Patent Application No. 2008-323742

SUMMARY OF INVENTION

An object of the present invention is to provide a packaging machine and a method capable of solving the above-described problems of the Background Art. One example of the object is to provide a vertical filling and packaging machine that can manufacture three-side seal type and four-side seal type packaging bags for retort food having high airtightness, and a manufacturing method of the packaging bags.

A vertical filling and packaging machine according to one aspect of the present invention includes: a bag-making guide that forms a cylindrical film by folding a sheet-like film fed downwardly in the center of a width thereof to overlap width direction ends of the film with each other;

a vertical seal device that forms a vertical seal part by performing heat-sealing to seal a side of an overlapping part of the cylindrical film, or to seal each of a side of a folding part and the side of the overlapping part side of the cylindrical film, the vertical seal device being disposed under the bag-making guide;

plural pairs of guide rollers that rotate sandwiching the side of the folding part and the side of the overlapping part of the cylindrical film fed downwardly;

a pair of ironing rollers that form an empty portion in the cylindrical film by rotating while sandwiching the cylindrical film in which content has been injected to feed the cylindrical film downwardly, the ironing rollers being disposed under the vertical seal device;

a lateral seal device that performs heat-sealing over a full width in a lateral direction of the empty portion of the cylindrical film to form a lateral seal part, and that cuts off the cylindrical film at the lateral seal part, the lateral seal device being disposed under the pair of ironing rollers;

a tension device that is disposed near positions of the ironing rollers and that pulls both sides of the cylindrical film laterally outward; and injection means that injects content into the cylindrical film, the injection means having an outlet for the content provided above the position of the ironing rollers.

In addition, it is characterized that the above-described tension device pulls both sides of the cylindrical film laterally outward to flatten a portion of the cylindrical film before the pair of ironing rollers sandwiches the portion of the cylindrical film, wherein the content has been injected into the cylindrical film.

According to the above-described configuration, since a body of the cylindrical film to be sandwiched by the ironing rollers is sandwiched between the ironing rollers in a state of being flattened by the tension device, wrinkles formed due to sandwiching by the ironing rollers become smaller and decrease compared with the case of a conventional filling and packaging machine. Hence, when the body of the cylindrical film, which has become a portion that has no content by passing through the ironing rollers, is heat-sealed by the lateral seal device, wrinkles of the lateral seal part become smaller and decrease. This allows for manufacturing packaging bags having higher airtightness than the three-side seal type or the four-side seal type bag manufactured by a conventional filling and packaging machine, and thus the present invention can be applied to the manufacture of retort pouches.

BRIEF DESCRIPTION OF DRAWINGS

FIG. 9 is a view illustrating operation of the vertical filling and packaging machine of the second embodiment.

FIG. 10c is a fragmentary view taken in a direction of arrows A-A of FIG. 10a.

FIG. 13b is a fragmentary view taken in a direction of arrows A-A of FIG. 13a.

FIG. 13c is a fragmentary view taken in a direction of arrows B-B of FIG. 13a.

DESCRIPTION OF EMBODIMENTS

Hereinafter, embodiments of the present invention will be described with reference to drawings. Here will be described, as an example, a vertical filling and packaging machine that manufactures retort pouches, which are four-side seal type packaging bags.

First Embodiment

Figure 1A:
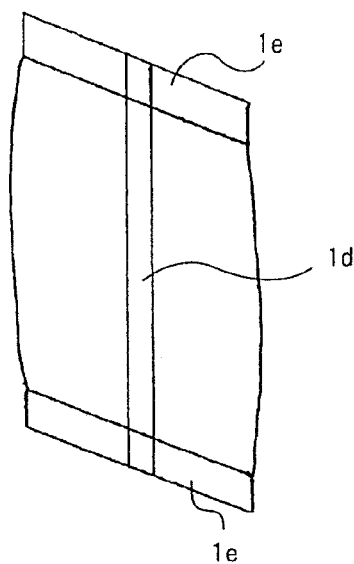
FIG. 1a is a view showing a pillow type as a form of a packaging bag.
Figure 1B:
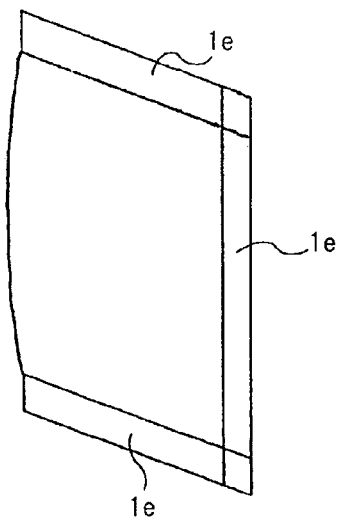
FIG. 1b is a view showing a three-side seal type as a form of a packaging bag.
Figure 1C:
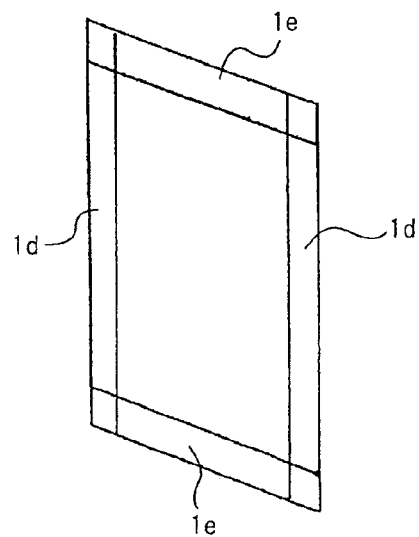
FIG. 1c is a view showing a four-side seal type as a form of a packaging bag.
Figure 2:
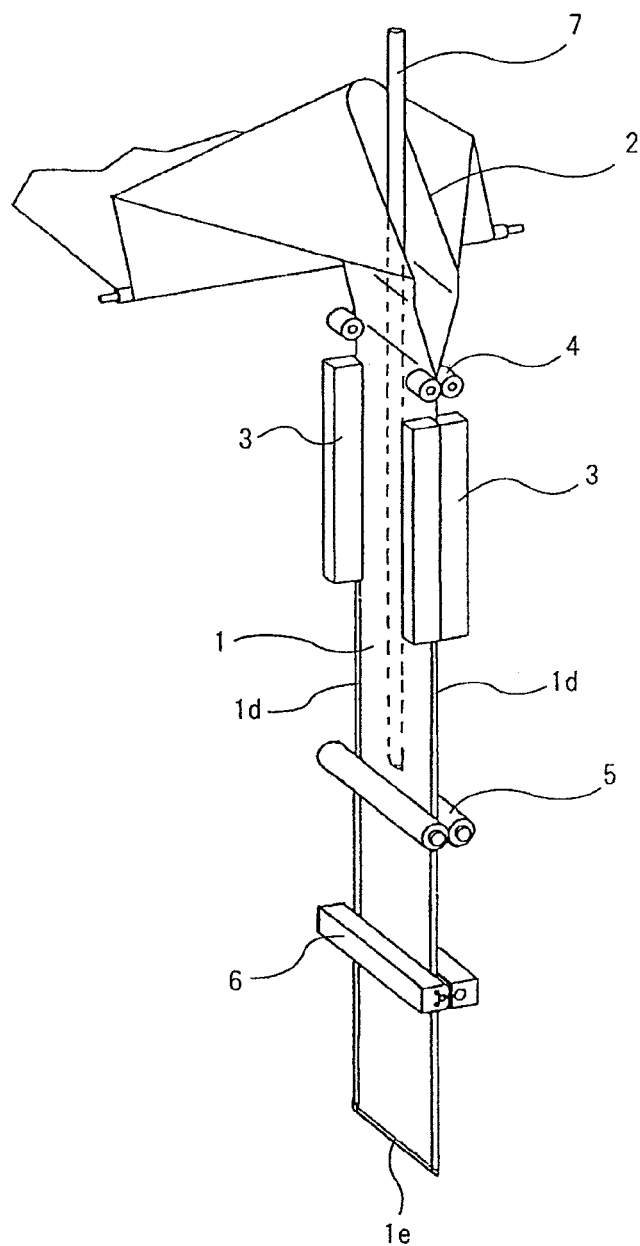
FIG. 2 is a view showing a main part of a conventional vertical filling and packaging machine (four-side seal type).
Figure 3:
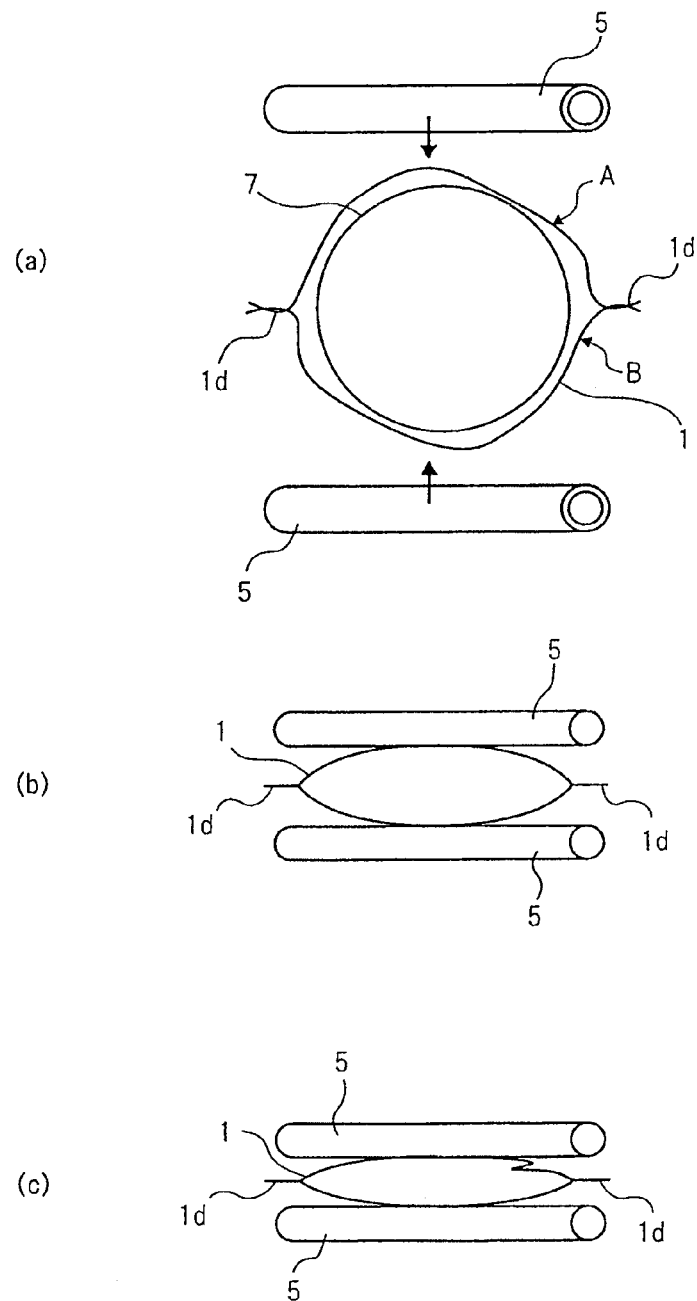
FIG. 3 is a view for illustrating a cause by which wrinkles are formed in a lateral seal part of a packaging bag, such as a three-side seal type or a four-side seal type packaging bag in the conventional vertical filling and packaging machine.
Figure 4A:
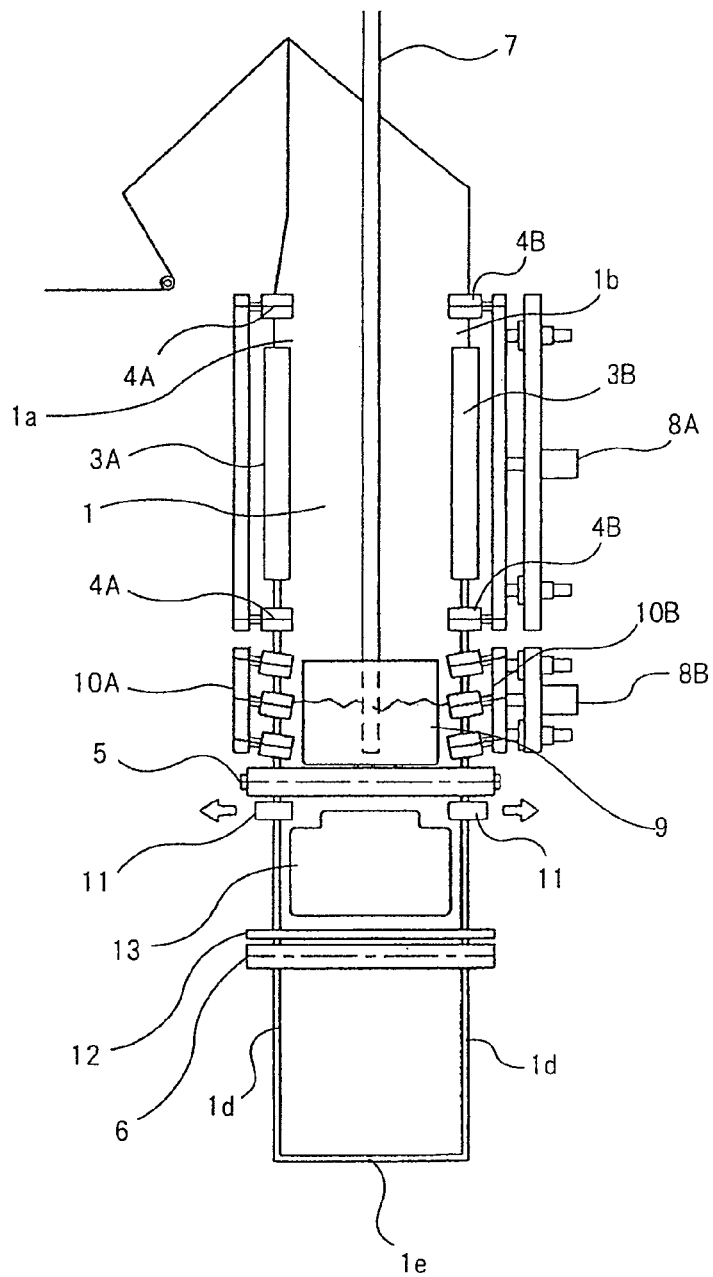
FIG. 4a is an elevational view schematically showing a vertical filling and packaging machine of a first embodiment of the present invention.
Figure 4B:
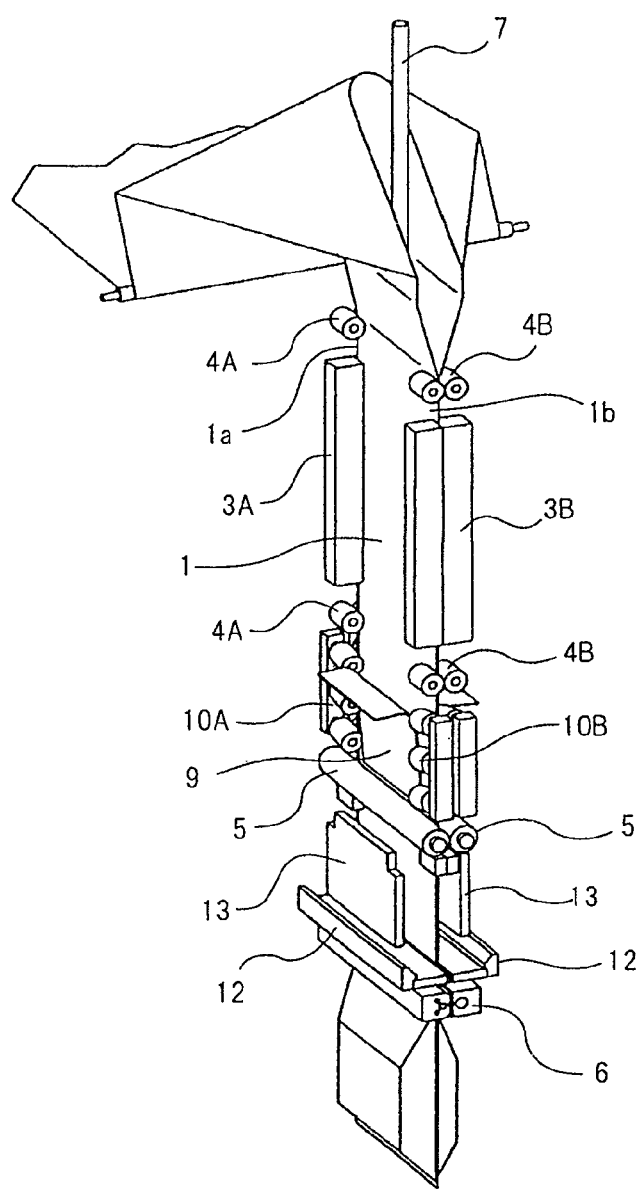
FIG. 4b is a perspective view schematically showing the vertical filling and packaging machine of the first embodiment of the present invention.

FIG. 4(a) is an elevational view schematically showing a vertical filling and packaging machine used for one part filling as a first embodiment of the present invention, and FIG. 4(b) is a perspective view schematically showing the vertical filling and packaging machine of the first embodiment. However, the same components as those in the conventional vertical filling and packaging machine shown in FIG. 2 will be described giving them the same symbols as in FIG. 2.

The first embodiment is the vertical filling and packaging machine in a case where a formed cylindrical film is filled with liquid or pasty content, i.e., in a case of one part filling.

The vertical filling and packaging machine of the embodiment includes bag-making guide 2 for overlapping with each other the width direction ends of a sheet-like film fed in a longitudinal direction to form flat cylindrical film 1.

In a lower part of bag-making guide 2, arranged are plural vertical seal devices 3A and 3B that perform heat-sealing in the longitudinal direction on each of folding part 1a and overlapping part 1b of film 1 formed in a flat cylindrical shape. Folding part 1a and overlapping part 1b of cylindrical film 1 are located on both sides in a lateral direction of cylindrical film 1, respectively.

Vertical seal devices 3A and 3B are arranged opposed to each other in a state of sandwiching therebetween folding part 1a and overlapping part 1b of cylindrical film 1. Opposed vertical seal devices 3A and 3B can move in a direction apart from each other and in a direction in contact with each other by a drive mechanism, which is not shown. Vertical seal part 1d is formed on both sides in the lateral direction of cylindrical film 1 by these vertical seal devices 3A and 3B.

On an upper side and a lower side of each of vertical seal devices 3A and 3B, provided are a pair of guide rollers 4A and 4B that rotate sandwiching both side ends in the lateral direction of cylindrical film 1 to feed cylindrical film 1 downwardly.

The pair of vertical seal devices 3A arranged at folding part 1a side of cylindrical film 1 and guide rollers 4A arranged on the upper side and the lower side of vertical seal device 3A are fixed so as not to move in the lateral direction. On the other hand, the pair of vertical seal devices 3B arranged at overlapping part 1b side of cylindrical film 1 and guide rollers 4B arranged on the upper side and the lower side of vertical seal device 3B are coupled to each other, and can move together in the lateral direction by one air cylinder 8A.

A pair of ironing rollers 5 is provided under guide rollers 4A and 4B located on the lower sides of each of vertical seal devices 3A and 3B. A pair of ironing rollers 5 separate content injected into cylindrical film 1 by sandwiching the full width in the lateral direction of cylindrical film 1, and conveys cylindrical film 1 downwardly along with guide rollers 4A and 4B by rotating while in the state of sandwiching cylindrical film 1. Therefore, pair of ironing rollers 5 is arranged opposed to each other sandwiching cylindrical film 1 therebetween, and can move in a direction apart from each other and in a direction in contact with each other by a drive mechanism, which is not shown. In addition, a pair of ironing rollers 5 is rotated in synchronization with the rotations of guide rollers 4A and 4B.

In addition, injection pipe 7 that fills cylindrical film 1 with liquid or pasty content extends in a vertical direction from an upper side of bag-making guide 2 to right above ironing rollers 5 through the inside of bag-making guide 2.

In the embodiment, a pair of guide plates 9 is installed at a predetermined interval in a region between guide rollers 4A and 4B located on the lower side of vertical seal devices 3A and 3B, and ironing rollers 5. Further, in this region, tension guide roller groups 10A and 10B are disposed along the respective sides in the lateral direction of cylindrical film 1. Tension guide roller groups 10A and 10B are also rotated in synchronization with the rotations of guide rollers 4A and 4B and ironing rollers 5.

The pair of guide plates 9 is arranged opposed to each other on a front surface and a back surface of cylindrical film 1, and restrict swelling of cylindrical film 1 due to the content. Opposed guide plates 9 are removable from the vertical filling and packaging machine. The space between the pair of guide plates 9 becomes narrower as it gets closer to ironing rollers 5.

Each of tension guide roller groups 10A and 10B has a function of rotating while sandwiching the sides in the lateral direction of cylindrical film 1 to feed cylindrical film 1 downwardly, and of pulling both sides of cylindrical film 1 laterally outward to thereby take sag out of a film surface. Therefore, all the roller pairs of each of guide roller groups 10A and 10B are supported in a state where a tip direction of a rotational axis of the roller is directed obliquely downwardly. It is to be noted that guide roller groups 10A and 10B of the example are each composed of three rubber roller pairs arranged in the longitudinal direction.

Guide roller group 10A disposed on one side of cylindrical film 1 is fixed so as not to move in the lateral direction. On the other hand, guide roller group 10B disposed on the other side of cylindrical film 1 can move in the lateral direction by one air cylinder 8B.

In addition, right under ironing rollers 5, tension devices 11 that hold both sides of cylindrical film 1 to pull laterally outward, respectively, are arranged.

The pair of lateral seal devices 6 is arranged under tension devices 11. The pair of lateral seal devices 6 forms lateral seal part 1e on cylindrical film 1 by sandwiching the full width of cylindrical film 1 therebetween to heat it. Therefore, the pair of lateral seal devices 6 is arranged opposed to each other sandwiching cylindrical film 1 therebetween, and can move in a direction apart from each other and in a direction in contact with each other by the drive mechanism, which is not shown. The opening and closing operation of lateral seal devices 6 is synchronized with the opening and closing operation of above-mentioned vertical seal devices 3A and 3B. In addition, lateral seal device 6 is composed of a block with a length exceeding the full width of cylindrical film 1. A heater is incorporated in the block included in one lateral seal device 6, and a cutting mechanism for cutting the lateral seal part of cylindrical film 1 is incorporated in the other block.

At a place upwardly spaced apart from lateral seal devices 6 at a predetermined interval, a pair of pressing parts 12 for sandwiching the full width of cylindrical film 1 is arranged. Therefore, the pair of pressing parts 12 is arranged opposed to each other sandwiching cylindrical film 1 therebetween, and can move in a direction apart from each other and in a direction to come into contact with each other by the drive mechanism, which is not shown.

Further, a pair of shaping plates 13 is installed in a region between ironing rollers 5 and pressing parts 12. The pair of shaping plates 13 is arranged opposed to each other on the front surface and the back surface of cylindrical film 1, and can move in a direction apart from each other and in a direction in contact with each other by the drive mechanism, which is not shown. Shaping plates 13 form a shape of a portion of cylindrical film 1 into which the content has been injected by sandwiching the portion of cylindrical film 1 into which the content has been injected at a predetermined interval to thereby restrict swelling of the portion. As a result of this, it becomes easy to monitor variability of the capacity of the content.

Figure 5:
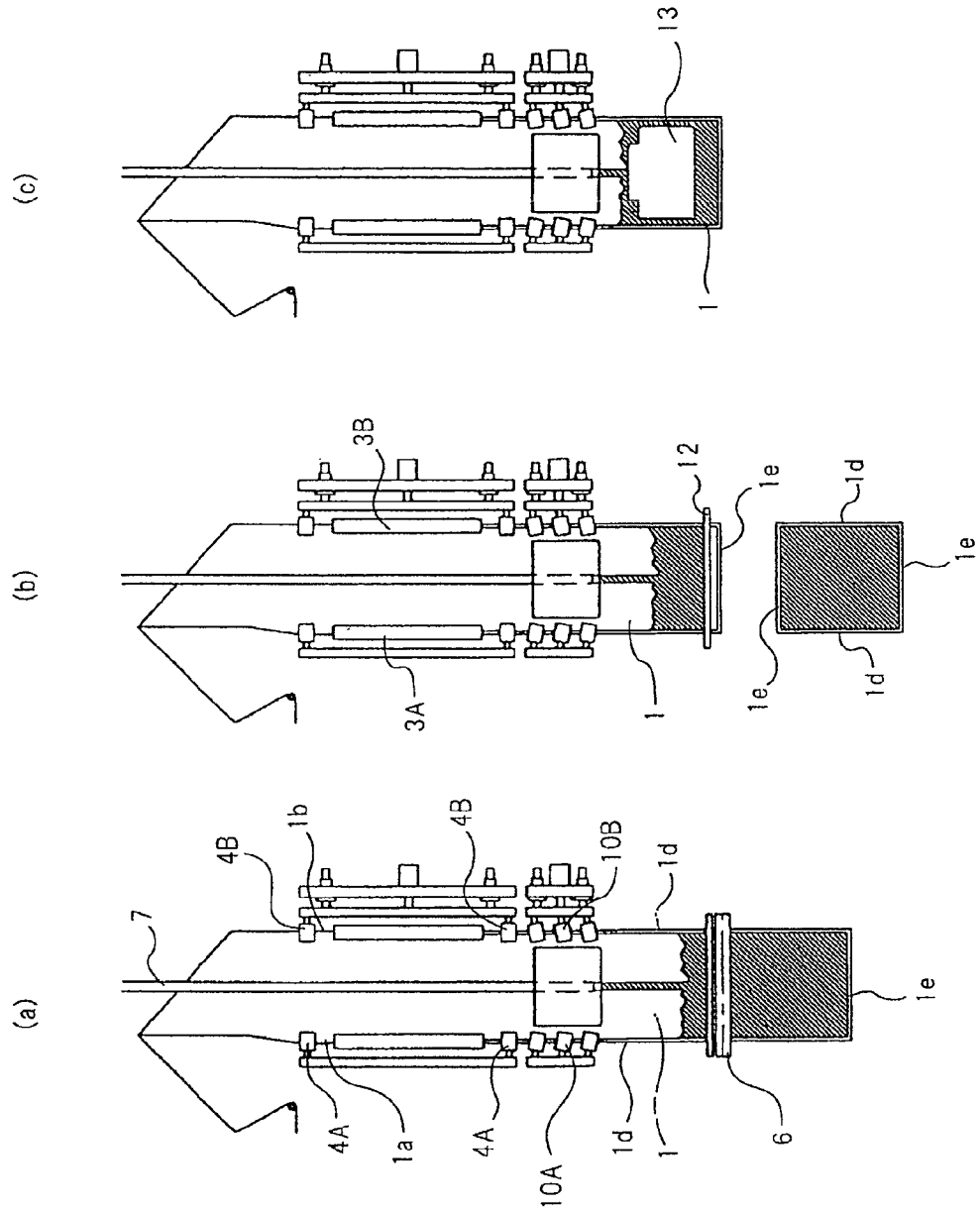
FIG. 5 is a view illustrating operation of the vertical filling and packaging machine of the first embodiment.
Figure 6:
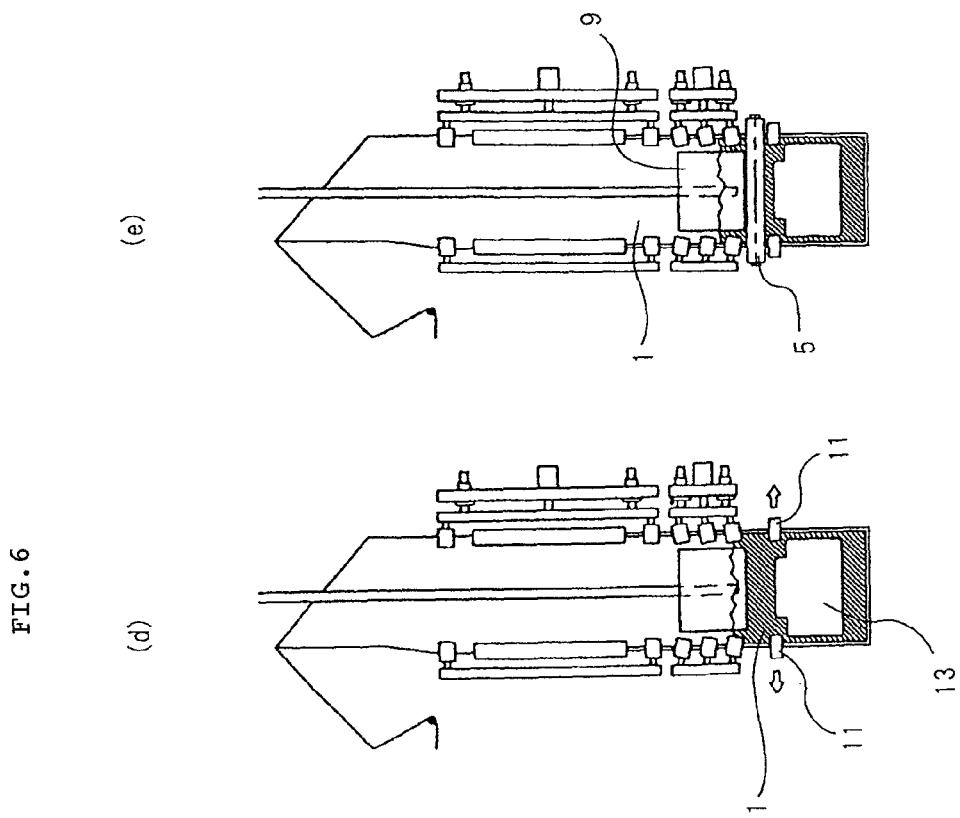
FIG. 6 is a view illustrating operation of the vertical filling and packaging machine of the first embodiment.

Next, operation of the vertical filling and packaging machine of the embodiment will be described with reference to FIGS. 5 and 6. It is to be noted that FIGS. 5(a) to 5(g) and FIGS. 6(a) to 6(g) show steps from injecting content to sealing the upper opening of the packaging bag with content at the lateral seal part. However, parts that do not at all affect cylindrical film 1 in each step are omitted from the drawings.

As shown in FIG. 5(a), the filling and packaging machine starts injecting liquid content from injection pipe 7 in cylindrical film 1 on which the lateral seal part 1e is formed over the full width in the lateral direction of cylindrical film 1 at the place of a pair of lateral seal devices 6. Vertical seal part 1d is formed on both sides of cylindrical film 1, respectively in this step, and both sides of cylindrical film 1 are sandwiched by guide rollers 4A and 4B and tension guide roller groups 10A and 10B. In addition, a pair of ironing rollers 5 (not shown) has already been opened at the time when injection of the content has started.

Subsequently, when injecting liquid content in cylindrical film 1, on which the lateral seal part was formed, lateral seal part 1e was cut off by the cutting mechanism (not shown) of lateral seal devices 6 as shown in FIG. 5(b). As a result, the four-side seal type packaging bag with content is separated from a film portion in which content is being injected. In addition, each of vertical seal devices 3A and 3B opens in synchronization with the opening operation of lateral seal devices 6.

Next, the pair of pressing parts 12 that sandwiched the right above portion of lateral seal part 1e of cylindrical film 1 is opened. Then, Until injection of the content is completed, as shown in FIG. 5(c), by shaping plates 13, the portion of cylindrical film 1 into which the content has been injected is sandwiched at a predetermined interval to thereby restrict the swelling of the portion, and the shape of the portion of cylindrical film 1 into which the content has been injected is formed. As a result, formation of sag (hanging wrinkles) is also reduced due to the weight of the filled content on the front surface and the back surface of longitudinally hung cylindrical film 1. This enables formation of the wrinkles on cylindrical film 1 to be reduced at the time when the subsequent sandwiching operation of ironing rollers 5 is performed.

Further, the present invention uses tension guide roller groups 10A and 10B above ironing rollers 5, and tension devices 11 under ironing rollers 5 in order to reliably prevent the formation of wrinkles due to ironing rollers 5.

That is, when shaping plates 13 press down the portion of cylindrical film 1 in which content has been injected, as shown in FIG. 6(d), both sides of cylindrical film 1 are held by tension devices 11 to pull laterally outward (in an arrow direction of FIG. 6(d)). As a result, the portion that is swollen with the content of cylindrical film 1 is flattened before the sandwiching operation by ironing rollers 5 is performed.

The space between ironing rollers 5 is closed as shown in FIG. 6(e) in a state where the portion sandwiched between ironing rollers 5 has been previously flattened. As a result, the content in cylindrical film 1 is separated into an upper part and a lower part in a state where the portion sandwiched between ironing rollers 5 has little wrinkles. In addition, when cylindrical film 1 of the upper side of ironing rollers 5 largely swells due to the content accumulated on the upper side of ironing rollers 5 when the space between ironing rollers 5 is closed, the film surface is easily wrinkled when the large swollen portion is fed between ironing rollers 5. Therefore, swelling of cylindrical film 1 of the upper side of ironing rollers 5 is restricted by the pair of guide plates 9. When the amount of the content in cylindrical film 1 of the upper side of ironing rollers 5 is the amount that can not largely swell cylindrical film 1, there may be no need for guide plates 9.

Subsequently, when guide rollers 4A and 4B, tension guide roller groups 10A and 10B, and ironing rollers 5 are rotated to thereby feed cylindrical film 1 downwardly (in an arrow direction of FIG. 6(f)) with the space between ironing rollers 5 closed, as shown in FIG. 6(f), empty portion 1c without content is formed in cylindrical film 1. At this time, tension guide roller groups 10A and 10B in which the tip direction of the rotational axis of each roller is directed obliquely downwardly sandwich both sides of cylindrical film 1 to pull cylindrical film 1 laterally outward and thereby take sag out of cylindrical film 1, while feeding cylindrical film 1 downwardly. Accordingly, cylindrical film 1 of the upper side of ironing rollers 5 advances between ironing rollers 5 in a flat state. Consequently, the formation of the wrinkles due to ironing rollers 5 decreases compared with the case of a conventional vertical filling and packaging machine.

Next, as shown in FIG. 6(g), when empty portion 1c is fed to lateral seal devices 6, the feeding of cylindrical film 1 is stopped, and vertical seal devices 3A and 3B and lateral seal device 6 are closed. As a result, the films with both sides of cylindrical film 1 overlapped and sandwiched by each of vertical seal devices 3A and 3B are heat-welded, whereby vertical seal part 1d is formed. In addition, the front surface and the back surface of the body of cylindrical film 1 sandwiched between lateral seal devices 6 are mutually heat-welded, whereby lateral seal part 1e is formed, and as a result, the upper opening of cylindrical film 1 is sealed. The closing operation of lateral seal devices 6 is performed after the body of cylindrical film 1 is sandwiched by the pair of pressing parts 12 so as not to move.

As mentioned above, the four-side seal type envelope-shaped packaging bag with a product can be obtained one after another by repeatedly carrying out the steps of FIGS. 5(a) to 5(g) and FIGS. 6(a) to 6(g) in this order. It is to be noted that when the pair of vertical seal devices 3A arranged on the folding part 1a side of cylindrical film 1 are removed, a three-side seal type envelope-shaped packaging bag with a product can be manufactured.

According to a configuration of the embodiment, tension guide roller groups 10A and 10B and tension devices 11 are provided near ironing rollers 5, and by these tension mechanisms, the body of cylindrical film 1 sandwiched between ironing rollers 5 is flattened before the sandwiching operation of ironing rollers 5 starts. As a result of this, since the film body is sandwiched between ironing rollers 5 in the flat state, wrinkles that have been formed due to sandwiching by ironing rollers 5 become smaller and decrease compared with the case of a conventional vertical filling and packaging machine. In addition, in the embodiment, the larger the number of injection pipes 7 and the pipe diameter become, the more can the formation of wrinkles be reduced compared with a conventional vertical filling and packaging machine of one part filling type. The packaging bag manufactured by the machine of the embodiment has high airtightness in the lateral seal part, and thus the machine can be applied to the retort pouch food.

It is to be noted that the one part filling and packaging machine of the embodiment can simultaneously manufacture a plurality of content filled packaging bags in a state in which they are aligned in the lateral direction by disposing a plurality of the same vertical seal devices as vertical seal devices 3A and 3B between vertical seal devices 3A and 3B.

Second Embodiment

Figure 7A:
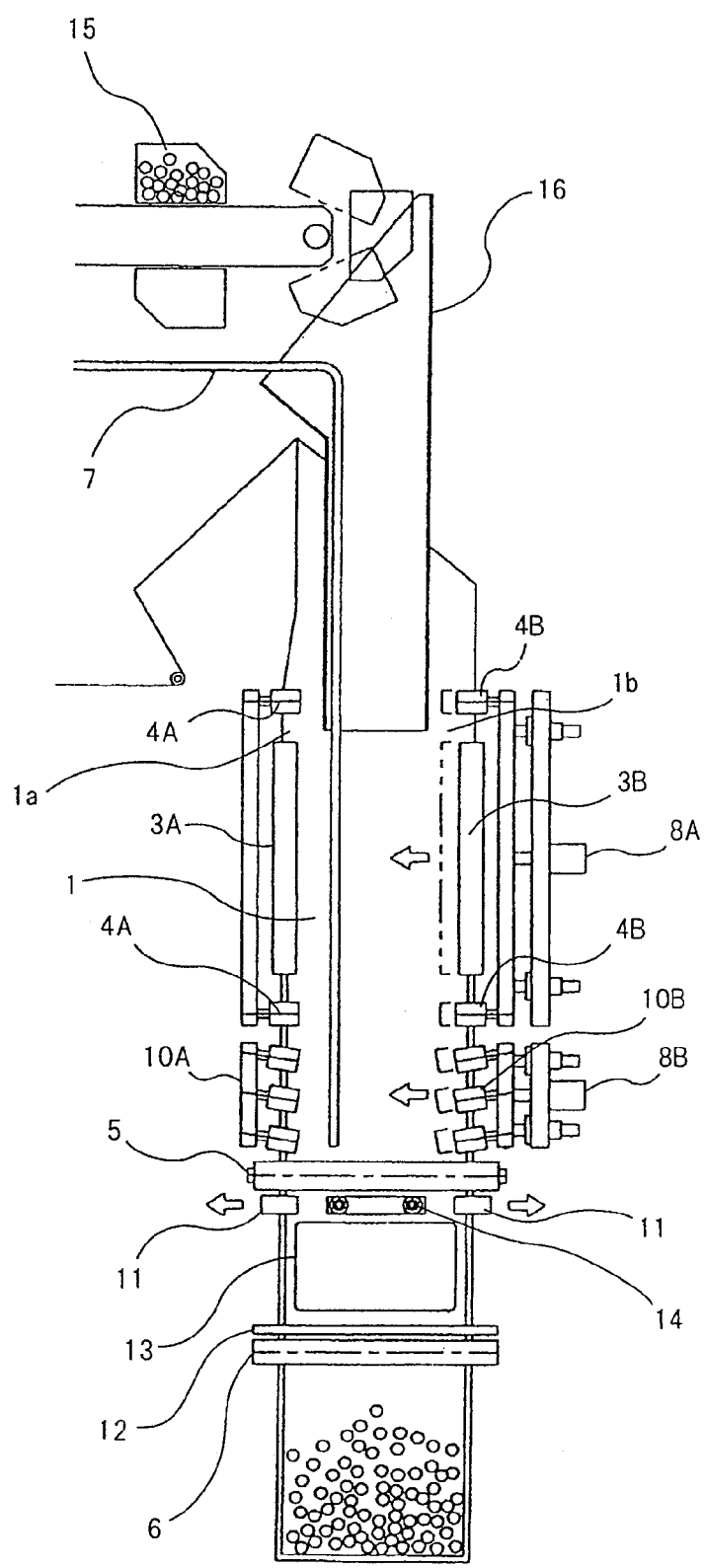
FIG. 7a is an elevational view schematically showing a vertical filling and packaging machine of a second embodiment of the present invention.
Figure 7B:
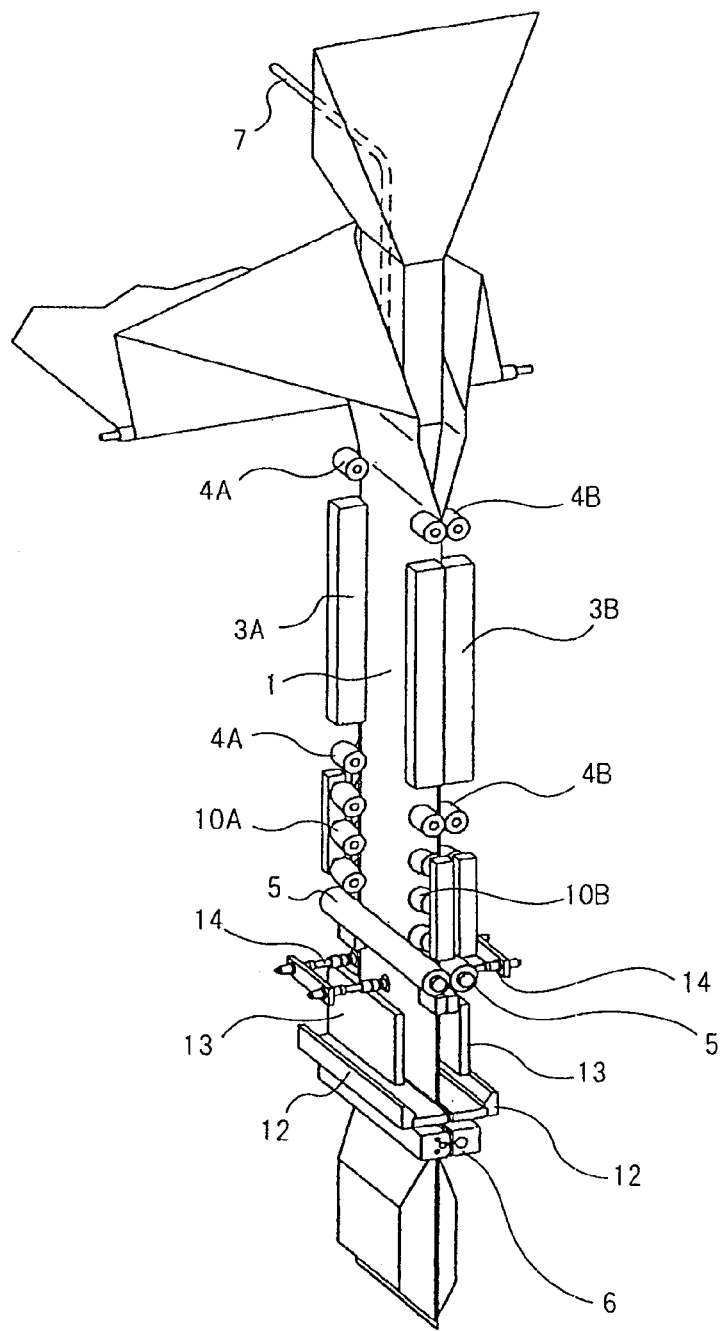
FIG. 7b is a perspective view schematically showing the vertical filling and packaging machine of the second embodiment of the present invention.

FIG. 7a is an elevational view schematically showing a vertical filling and packaging machine as a two parts filling machine according to a second embodiment of the present invention, and FIG. 7b is a perspective view schematically showing the vertical filling and packaging machine of the second embodiment. However, the same components as those in the conventional vertical filling and packaging machine shown in FIG. 2 will be described giving them the same symbols as in FIG. 2.

The second embodiment is a vertical filling and packaging machine in a case where a formed cylindrical film is filled with liquid, pasty, or solid content, i.e., in the case of two part filling.

The embodiment mainly differs with respect to the point where rectangular cylindrical injection pipe 16 for injecting solid content is further provided, the point where guide plates 9 are removed, and the point where at least a pair of vacuum pads 14 is further provided that pull the front surface and the back surface of cylindrical film 1 while suctioning them, as compared with the first embodiment (FIGS. 4a and 4b). It becomes possible to perform two parts filling by changing these points with respect to the packaging machine of the first embodiment.

When describing the changed points in detail, as shown in FIGS. 7a and 7b, injection pipe 16 for solid content extends in the vertical direction from an upper side of bag-making guide 2 to the vicinity of the upper ends of vertical seal devices 3A and 3B through an inside of bag-making guide 2. A passage area of injection pipe 16 is not less than five times compared with a passage area of injection pipe 7 that fills a packaging bag with liquid or pasty content. In addition, injection pipe 7 for liquid or pasty content is installed through injection pipe 16 for solid content. It is to be noted that injection pipe 16 for solid content may include an elevating/lowering mechanism (not shown) that can move up and down injection pipe 16 to change a position of the lowermost end of the pipe from the vicinity of the upper ends to the vicinity of the lower ends of vertical seal devices 3A and 3B.

Further, a downstream end of bucket conveyor 15 for supplying solid content is disposed at an upper opening of injection pipe 16 for solid content.

The pair of vacuum pads 14 is installed opposed to each other right under ironing rollers 5 while sandwiching cylindrical film 1 therebetween.

Components other than the above-described points are the same as those in the first embodiment.

Next, operation of the vertical filling and packaging machine of the embodiment will be described with reference to FIGS. 8 and 9. It is to be noted that FIGS. 8(*a*) to 8(*c*) and FIGS. 9(*d*) to 9(*g*) show steps from injecting content to sealing the upper opening of the packaging bag with content at the lateral seal part. However, parts that do not at all affect cylindrical film 1 in each step are omitted from the drawings.

Figure 8:
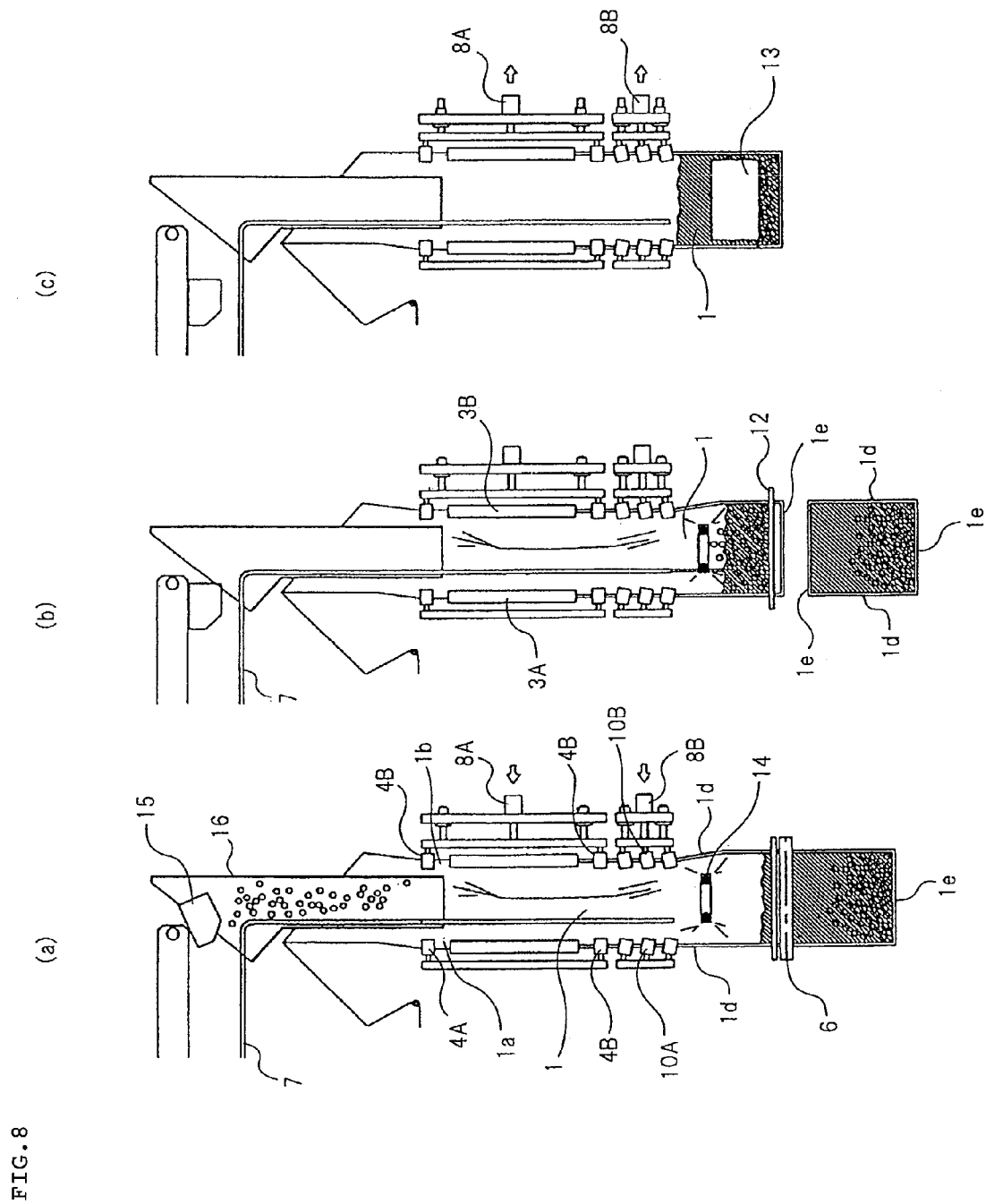
FIG. 8 is a view illustrating operation of the vertical filling and packaging machine of the second embodiment.

As shown in FIG. 8(*a*), the filling and packaging machine starts injecting solid content from injection pipe 16 in cylindrical film 1 on which lateral seal part 1*e* is formed over the full width in the lateral direction of cylindrical film 1 at the place where the pair of lateral seal devices 6 is located. Vertical seal part 1*d* is formed on both sides of cylindrical film 1, respectively in this step, and both sides of cylindrical film 1 are sandwiched by guide rollers 4A and 4B and tension guide roller groups 10A and 10B. In addition, the pair of ironing rollers 5 (not shown) has already been opened at the time of starting injection of the content.

In particular, in the embodiment, guide roller 4B and tension guide roller group 10B located on overlapping part 1*b* side of cylindrical film 1 are simultaneously moved laterally inward (in an arrow direction of FIG. 8(*a*)) by air cylinders 8A and 8B before injection of the content commences, and as a result, cylindrical film 1 largely sags in the shape of a cylindrical. In addition, the front surface and the back surface of cylindrical film 1 are pulled while they are being suctioned by the pair of vacuum pads 14 located near ironing rollers 5 at the same time when this sagging operation is performed. By such operations, the inside of cylindrical film 1 is largely opened, and a passage of the solid content is secured.

Subsequently, liquid content is injected from injection pipe 7 in cylindrical film 1 as shown in FIG. 8(*b*). The injection order of content is set as described above to prevent liquid from splattering and becoming attached to an upward film, and to prevent the amount of content in a plurality of manufactured packaging bags from being different from each other when solid content is injected into cylindrical film 1 after it is filled with liquid content.

Subsequently, when liquid content is being injected, cylindrical film 1 is cut off at lateral seal part 1*e* by the cutting mechanism (not shown) of lateral seal devices 6. As a result, the four-side seal type packaging bag with content is separated from a film portion in which content is being injected. In addition, each of vertical seal devices 3A and 3B opens in synchronization with the opening operation of lateral seal devices 6.

After that, the pair of pressing parts 12 that have sandwiched the right above portion of lateral seal part 1*e* of cylindrical film 1 is opened. Additionally, guide roller 4B and tension guide roller group 10B are moved laterally outward (in an arrow direction of FIG. 8(*c*)) by air cylinders 8A and 8B as shown in FIG. 8(*c*), and as a result, the sag of cylindrical film 1 is returned to its original state.

Until injection of the content is completed from that, the portion of cylindrical film 1 into which content has been injected is sandwiched at a predetermined interval to thereby restrict swelling of the portion, and the shape of the portion of cylindrical film 1 into which the content has been injected is formed. As a result, formation of sag (hanging wrinkles) on the front surface and the back surface of longitudinally hung cylindrical film 1 is also reduced due to the weight of the filled content. This enables formation of wrinkles on cylindrical film 1 to be reduced at the time of the subsequent sandwiching operation by ironing rollers 5.

Further, the present invention uses tension guide roller groups 10A and 10B above ironing rollers 5, and tension devices 11 under ironing rollers 5, as in the first embodiment, in order to reliably prevent formation of wrinkles due to ironing rollers 5.

That is, when the portion in which content of cylindrical film 1 has been injected is being pressed down by shaping plates 13, as shown in FIG. 9(*d*), both sides of cylindrical film 1 are held by tension devices 11 to pull laterally outward (in an arrow direction of FIG. 9(*d*)). As a result, the portion swollen with the content of cylindrical film 1 is flattened before the sandwiching operation by ironing rollers 5 is performed.

The space between ironing rollers 5 is closed as shown in FIG. 9(*e*) in a state where the portion sandwiched between ironing rollers 5 is previously flattened. As a result, the content in cylindrical film 1 is separated into an upper part and a lower part in a state where the portion sandwiched between ironing rollers 5 has few wrinkles.

In addition, when cylindrical film 1 of the upper side of ironing rollers 5 largely swells due to the content that has accumulated on the upper part of ironing rollers 5 when the space between ironing rollers 5 is closed, wrinkles are easily formed on the film surface when the large swollen portion is fed between ironing rollers 5. Therefore, it is desirable that swelling of cylindrical film 1 of the upper side of ironing rollers 5 be restricted by the pair of guide plates 9 as provided in the first embodiment. If guide plates 9 are provided to the machine of the embodiment, the machine is operated so that the space between guide plates 9 is expanded according to the size of the inside of cylindrical film 1 when the inside of cylindrical film 1 is largely expanded by vacuum pad 14 as shown in FIG. 8(*a*), and the space between guide plates 9 is reduced to a predetermined interval when ironing rollers 5 are closed. However, when the amount of injected content is the amount by which cylindrical film 1 of the upper side of ironing rollers 5 is not largely swollen, there may be no need for guide plates 9 as in the embodiment.

Subsequently, when guide rollers 4A and 4B, tension guide roller groups 10A and 10B, and ironing rollers 5 are rotated to thereby feed cylindrical film 1 downwardly (in an arrow direction of FIG. 9(*f*)) with the space between ironing rollers 5 closed as shown in FIG. 9(*f*), empty portion 1*c* without content is formed in cylindrical film 1. At this time, tension guide roller groups 10A and 10B in which the tip direction of the rotational axis of each roller is directed obliquely downwardly sandwich both sides of cylindrical film 1, pull them laterally outward, and thereby take sag out of cylindrical film 1 while feeding cylindrical film 1 downwardly. Accordingly, cylindrical film 1 of the upper side of ironing rollers 5 advances between ironing rollers 5 in a flat state. Consequently, the formation of the wrinkles due to ironing rollers 5 decreases compared with the case of the conventional vertical filling and packaging machine.

Next, as shown in FIG. 9(*g*), when empty portion 1*c* is fed to lateral seal devices 6, feed of cylindrical film 1 is stopped, and vertical seal devices 3A and 3B and lateral seal devices 6 are closed. As a result, the films with both sides of cylindrical film 1 overlapped and sandwiched by each of vertical seal devices 3A and 3B are heat-welded, whereby vertical seal part 1*d* is formed. In addition, the front surface and the back surface of the body of cylindrical film 1 sandwiched between lateral seal devices 6 are mutually heat-welded, whereby lateral seal part 1*e* is formed, and as a result, the upper opening of cylindrical film 1 is sealed. The closing operation of lateral seal devices 6 is performed after the body of cylindrical film 1 is sandwiched by the pair of pressing parts 12 so as not to move.

As mentioned above, the four-side seal type envelope-shaped packaging bag with a product can be obtained one after another by repeatedly carrying out the processes of FIGS. 8(*a*) to 8(*c*) and FIGS. 9(*d*) to 9(*g*) in this order. It is to be noted that when the pair of vertical seal devices 3A arranged at folding part 1*a* side of cylindrical film 1 are removed, a three-side seal type envelope-shaped packaging bag with the product can be manufactured.

According to the configuration of the embodiment, tension guide roller groups 10A and 10B and tension devices 11 are provided near ironing rollers 5, and by these tension mechanisms, the body of cylindrical film 1 sandwiched between ironing rollers 5 is flattened before the sandwiching operation by ironing rollers 5 is performed. As a result of this, since the film body is sandwiched between ironing rollers 5 in the flat state, wrinkles formed due to sandwiching by ironing rollers 5 become smaller and decrease compared with the case of the conventional vertical filling and packaging machine of two parts filling type. The packaging bag manufactured by such packaging machine of the embodiment has high airtightness in the lateral seal part, and thus the machine can be applied to retort pouch food.

In particular, in the two parts filling and packaging machine of the embodiment, an outlet of the lowermost end of injection pipe 16 for solid content is arranged upwardly apart from the position of ironing rollers 5, the inside of cylindrical film 1 is expanded to secure an injection passage only when solid content is injected into cylindrical film 1, and the body of cylindrical film 1 sandwiched between ironing rollers 5 is flattened before sandwiching operation by ironing rollers 5 is performed. Hence, operation of flattening cylindrical film 1 can be carried out without preventing the injection of solid content by injection pipe 16 whose pipe diameter is comparatively large.

It is to be noted that the two parts filling and packaging machine of the embodiment serves as a manufacturing apparatus of envelope-shaped packaging bags only with solid content if injection pipe 7 for liquid content is removed. In addition, a plurality of packaging bags with content can be manufactured simultaneously in a state in which they are aligned in the lateral direction by disposing between vertical seal devices 3A and 3B in the lateral direction a plurality of same vertical seal devices as vertical seal devices 3A and 3B.

Third Embodiment

Figure 10A:
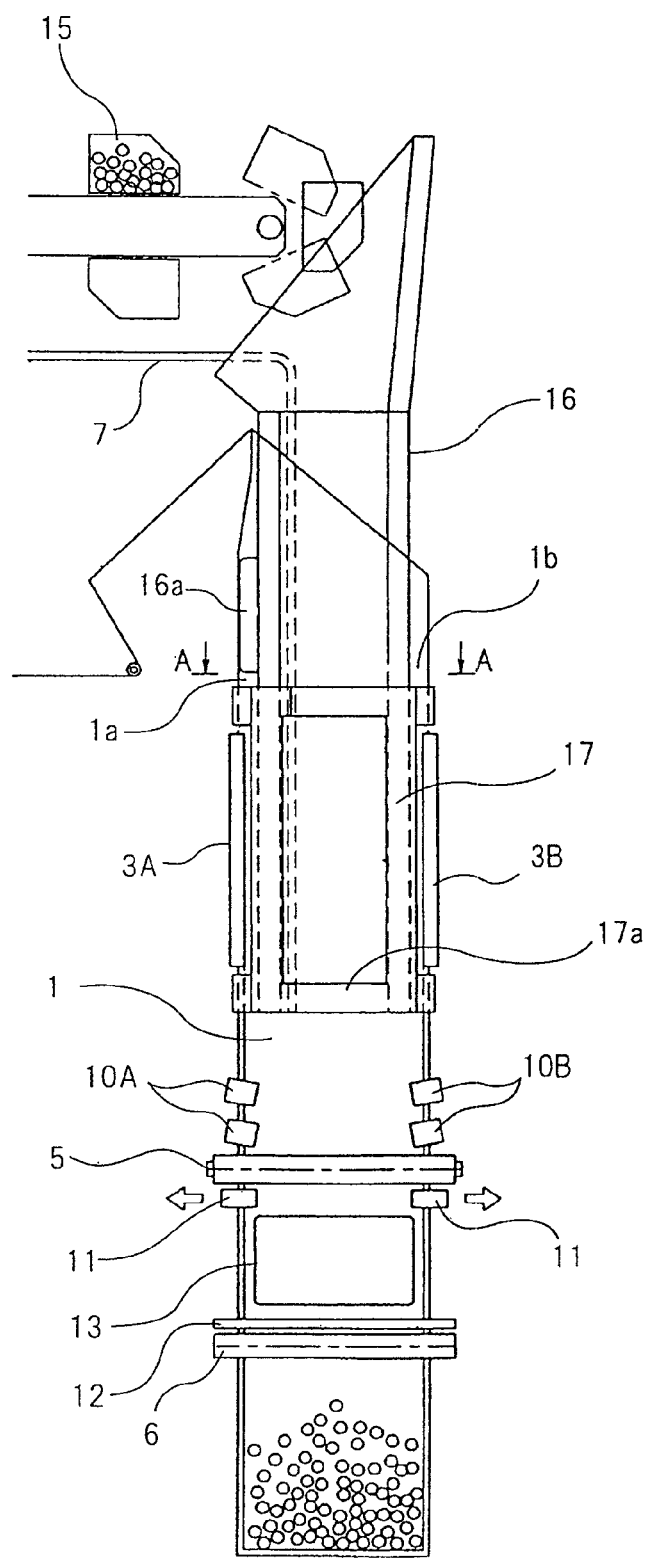
FIG. 10a is an elevational view schematically showing a vertical filling and packaging machine as a two parts filling machine according to a third embodiment of the present invention.
Figure 10B:
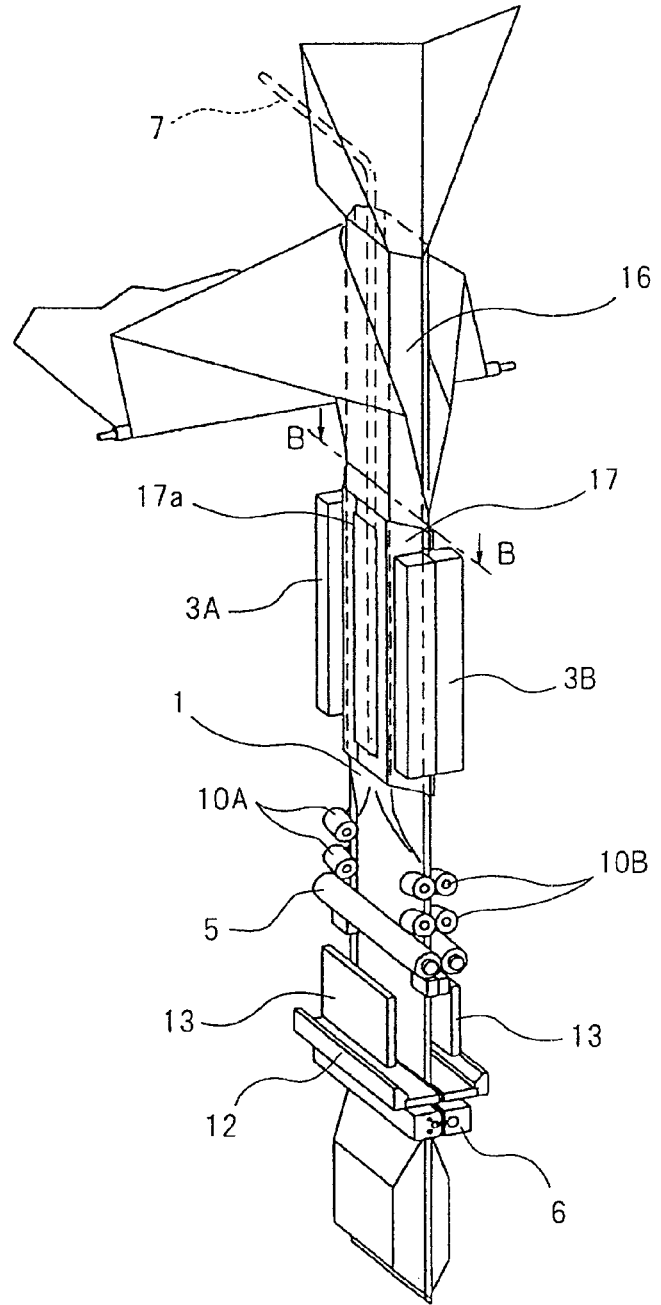
FIG. 10b is a perspective view schematically showing the vertical filling and packaging machine of the third embodiment.
Figure 10C:
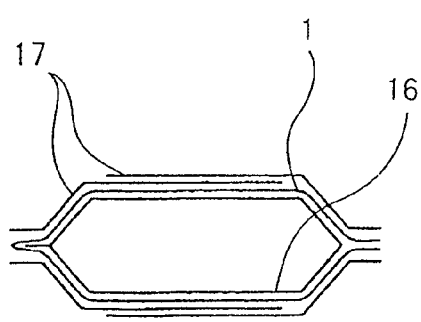
Figure 10D:
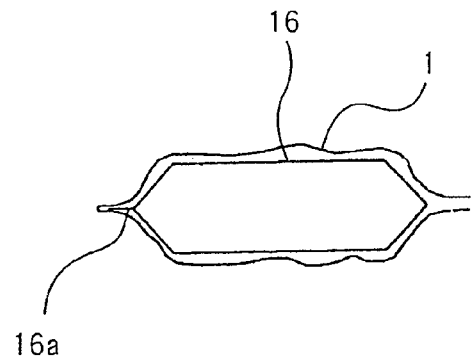
FIG. 10d is a view showing a state where an outer guide has been removed in FIG. 10c.
Figure 10E:
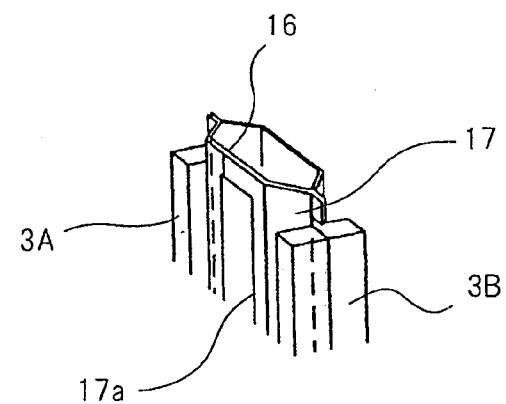
FIG. 10e is a fragmentary view taken in a direction of arrows B-B of FIG. 10b.

FIG. 10*a* is an elevational view schematically showing a vertical filling and packaging machine as the two parts filling machine according to a third embodiment of the present invention, and FIG. 10*b* is a perspective view schematically showing the vertical filling and packaging machine of the third embodiment. FIG. 10*c* is a fragmentary view taken in a direction of arrows A-A of FIG. 10*a*, FIG. 10*d* is a view showing a state where the outer guide has been removed in FIG. 10*c*, and FIG. 10*e* is a fragmentary view taken in a direction of arrows B-B of FIG. 10*b*. However, the same components as those in the conventional vertical filling and packaging machine shown in FIG. 2 will be described giving them the same symbols as in FIG. 2.

The third embodiment is a vertical filling and packaging machine that carries out the two parts filling similar to that in the second embodiment.

The embodiment mainly differs in a point where the shape of injection pipe 16 for solid content is a hexagon, and the lower end of injection pipe 16 is located near the lower ends of vertical seal devices 3A and 3B, a point where guide rollers 4A and 4B, air cylinders 8A and 8B, and vacuum pad 14 are removed, and a point where outer guide 17 is installed outside injection pipe 16, as compared with the second embodiment (FIGS. 7*a* and 7*b*).

Although the injection passage is expanded only when solid content is injected in the second embodiment, the injection passage inside cylindrical film 1 is widened by injection pipe 16 also in other cases when solid content is injected in the embodiment. In such configuration, changing the shape of injection pipe 16 and the position of the lower end of injection pipe 16 and providing outer guide 17 causes the wrinkles of the lateral seal part to become small and to decrease.

Describing the changed points in detail, as shown in FIGS. 10*a* and 10*b*, injection pipe 16 for solid content extends in the vertical direction from the upper side of bag-making guide 2 to the vicinity of the lower ends of vertical seal devices 3A and 3B through the inside of bag-making guide 2. The shape of injection pipe 16 is a hexagonal cylindrical one. In particular, as shown in FIGS. 10*c* and 10*e*, two surfaces of injection pipe 16 corresponding to the front surface and the back surface of cylindrical film 1 are widely formed in the lateral direction of cylindrical film 1, and the space between these two surfaces is made sufficiently narrower than the width in the lateral direction. In addition, fin 16*a* that facilitates fold of the film is fixed to a corner of injection pipe 16 corresponding to folding part 1*a* of cylindrical film 1.

Further, outer guide 17 is installed outside injection pipe 16 as shown in FIGS. 10*a* and 10*b*. Outer guide 17 is provided in a range from the vicinity of the upper ends to the vicinity of the lower ends of vertical seal devices 3A and 3B, and is arranged so that it is spaced apart from the outer surface of injection pipe 16 at a certain space through which cylindrical film 1 can pass. As shown in FIG. 10*d*, when there is no outer guide 17, the space through which solid content can pass is secured while the inside of cylindrical film 1 is guided by injection pipe 16, but the film surface of cylindrical film 1 sags. Consequently, since cylindrical film 1 is located along the outer surface of injection pipe 16 by pressing cylindrical film 1 from the outside with outer guide 17, sag of the film surface is eliminated.

Additionally, hole 17*a* is opened in portions of outer guide 17 corresponding to the front surface and the back surface of cylindrical film 1. This is for the purpose of reducing the frictional resistance generated when cylindrical film 1 is fed downwardly in a state where outer guide 17 and cylindrical film 1 are in contact with each other.

Further, outer guide 17 is configured by overlapping a plurality of plate members as shown in FIG. 10*c* so that outer guide 17 can be varied in the lateral direction. When hexagonal cylindrical injection pipe 16 of the embodiment is exchanged according to a width in the lateral direction of a packaging bag to be manufactured, outer guide 17 can be expanded and contracted in the lateral direction to conform to the width in the lateral direction of injection pipe 16.

Components other than the above-described points are the same as that in the second embodiment.

In addition, as shown in FIGS. 8(*a*) to 8(*c*), the operation of the packaging machine of the embodiment is the same as that in the second embodiment except for a point where the inside of cylindrical film 1 is largely opened while causing cylindrical film 1 to largely sag in a cylindrical shape to thereby secure the passage for solid content when the solid content is injected, and a point where sag in cylindrical film 1 is returned to the original state when injection of the solid content is completed.

Also in the configuration of the embodiment, tension guide roller groups 10A and 10B and tension devices 11 are provided near ironing rollers 5, and by these tension mechanisms, the body of cylindrical film 1 sandwiched between ironing rollers 5 can be flattened before the sandwiching operation by ironing rollers 5 is performed. Therefore, wrinkles formed due to sandwiching by ironing rollers 5 become smaller and decrease compared with the case of a conventional vertical filling and packaging machine of two parts filling type. The packaging bag manufactured by such packaging machine also has high airtightness in the lateral seal part, and thus the machine can be applied to retort pouch food.

Other Embodiment

Figure 11:
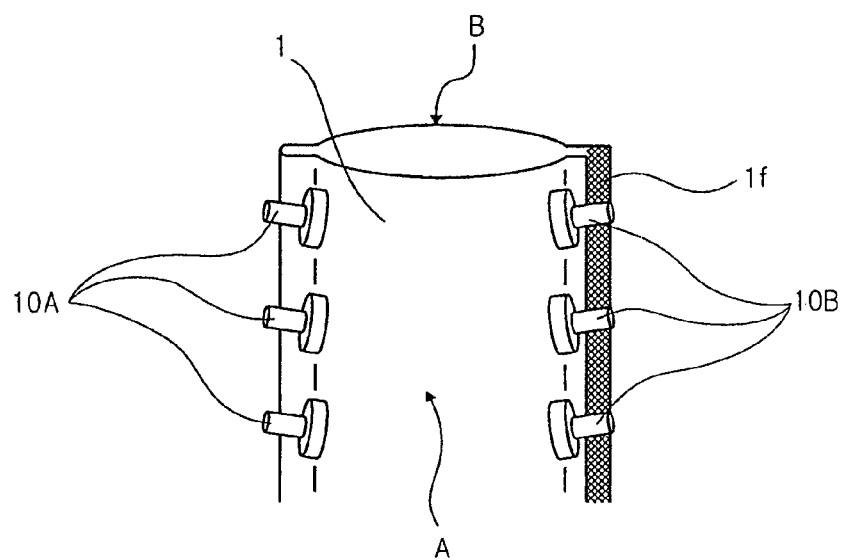
FIG. 11 is a view showing a roller shape of a tension guide roller as another embodiment.

It is preferable that a rubber roller included in tension guide roller groups 10A and 10B have a shape as shown in FIG. 11 in each above-described embodiment. As shown in FIG. 11, when the end surfaces of a sheet-like film are misaligned as the film is folded and the width direction ends thereof are overlap with each other, welding surface (sealant) 1f inside cylindrical film 1 is exposed. There may be a case where friction coefficients of exposed sealant 1f and the outer surface of cylindrical film 1 are different depending on film materials.

Consequently, the rubber rollers have steps so that they can sandwich cylindrical film 1 while avoiding sealant 1f portion. As a result, since each rubber roller pair of tension guide roller groups 10A and 10B sandwiches places that are in the same friction state of cylindrical film 1, and since both sides of cylindrical film 1 can be pulled laterally outward, the formation of sag and wrinkles become difficult. This configuration is effective when bags are manufactured with a film in which sealant becomes sticky.

Figure 12:
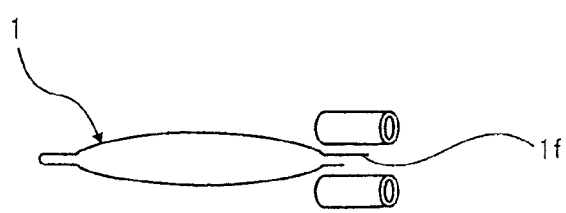
FIG. 12 is a top view for illustrating an effect of the roller shape shown in FIG. 11.

On the other hand, when the rubber rollers do not have steps as shown in FIG. 12, one of the pair of rubber rollers comes into contact with sealant 1f, and the other rubber roller comes into contact with the outer surface of cylindrical film 1. In this case, since frictional forces of the respective rubber rollers are different from each other and since the feed amounts of front surface A and back surface B of cylindrical film 1 are different from each other, wrinkles are formed on the film surface. Accordingly, when such problem occurs due to the film material, it is good to employ rollers with steps for tension guide roller groups 10A and 10B.

Figure 13A:
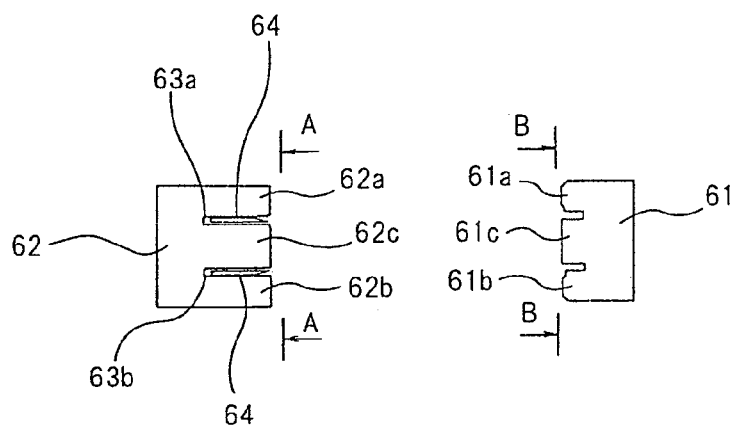
FIG. 13a is a cross-sectional view across a pair of seal bars included in the lateral seal device used for the embodiments of the present invention.
Figure 13B:
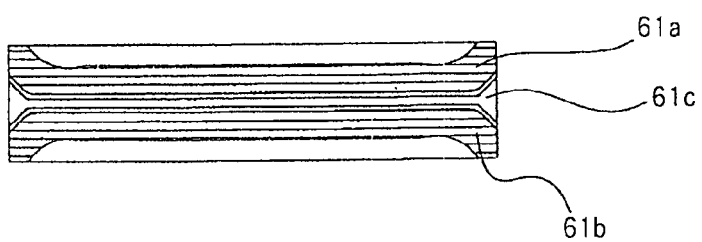
Figure 13C:
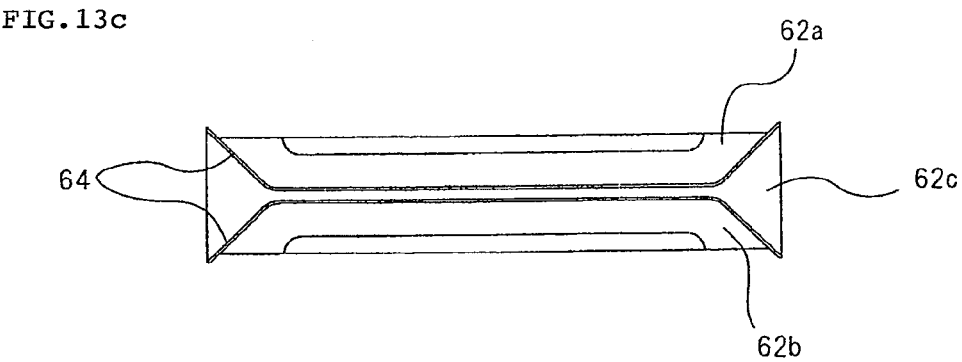
Figure 13D:
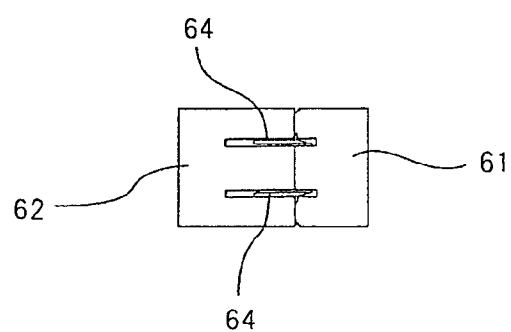
FIG. 13d is a cross-sectional view showing that a space between the pair of seal bars shown in FIG. 13a is closed and then a cylindrical film is cut off.
Figure 14:
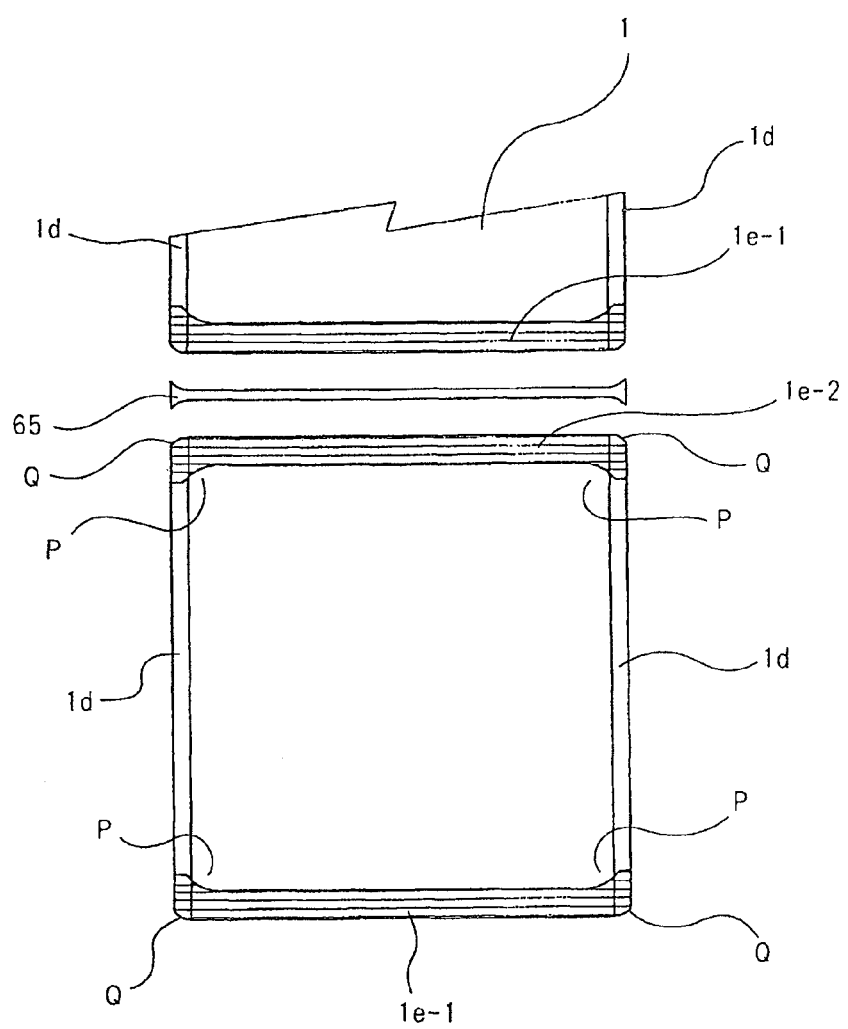
FIG. 14 is a view showing a shape of a bag cut by the cutting mechanism of a lateral seal device shown in FIGS. 13a to 13d.

Next will be described in detail a configuration of lateral seal device 6 of each above-described embodiment. FIG. 13a is a cross-sectional view across a pair of seal bars included in a lateral seal device, FIG. 13b is a fragmentary view taken in a direction of arrows A-A of FIG. 13a, FIG. 13c is a fragmentary view taken in a direction of arrows B-B of FIG. 13a, and FIG. 13d is a cross-sectional view showing that the space between the pair of seal bars shown in FIG. 13a is closed and then a cylindrical film is cut off. FIG. 14 is a view showing the shape of a bag separated by lateral seal devices 6.

Lateral seal device 6 has two seal bars 61 and 62 arranged opposed to each other, and has a configuration in which cylindrical film 1 can pass between seal bars 61 and 62 (FIG. 13a).

As shown in FIG. 13b, the surface of one seal bar 61 opposed to cylindrical film 1 has first convex portion 61a, second convex portion 61b, and intermediate portion 61c of convex portions 61a and 61b that are higher than the periphery. First convex portion 62a, second convex portion 62b, and intermediate portion 62c of convex portions 62a and 62b that are higher than the periphery, are formed on the other seal bar 62. Convex portions 61a and 62a arranged so that they are opposed to each other are formed in a shape so as to form lateral seal part 1e-1 (refer to FIG. 14) extending in the lateral direction over the full width of cylindrical film 1. In addition, convex portions 61b and 62b arranged so that they are opposed to each other are formed in a shape so as to form lateral seal part 1e-2 (refer to FIG. 14) extending in the lateral direction over the full width of cylindrical film 1. Lateral seal part 1e-1 is a seal part that seals the lower part of each packaging bag, and lateral seal part 1e-2 is a seal part that seals the upper part of each packaging bag.

First and second convex portions 61a and 61b of seal bar 61 incorporate a heater to generate heat for heat-sealing cylindrical film 1, respectively. Accordingly, when cylindrical film 1 is sandwiched and pressurized between seal bars 61 and 62, lateral seal parts 1e-1 and 1e-2 are formed.

In such seal bars 61 and 62, the insides of the corners of a packaging bag at which vertical seal part 1d and lateral seal part 1e intersect each other can be made round by making both ends of respective convex portions 61a, 62a, 61b, and 62b into an R-shape. That is, square corners P of a content filling portion of the bag formed with internal sides of lateral seal parts 1e-1 and 1e-2 and an internal side of vertical seal part 1d become rounded.

In addition, as shown in FIG. 13a, on one seal bar 62, first groove portion 63a that separates first convex portion 62a and intermediate portion 62c, and second groove portion 63b that separates second convex portion 62b and intermediate portion 62c are formed over the entire length in the longitudinal direction of seal bar 62. Cutter 64 is held in a retractable manner in groove portions 63a and 63b, respectively.

It is to be noted that although a similar groove portion is also formed on the other seal bar 61 opposed to seal bar 62, the groove portion of the other seal bar 61 does not include cutter 64.

Cutter 64 included in seal bar 61 protrudes to advance into the groove portion of the other seal bar 64 when two seal bars 61 and 62 are in contact with each other as shown in FIG. 13d. As a result, lateral seal parts 1e-1 and 1e-2 of cylindrical film 1 are divided in the longitudinal direction as shown in FIG. 14. At this time, the separated film portion between two cutters 64 becomes waste 65.

In addition, the outer sides of corners of the packaging bag at which vertical seal part 1d and lateral seal part 1e intersect each other can be made round by bending both ends of cutter 64 into an R-shape. That is, square corners Q of the outer periphery of the bag formed with the outer sides of lateral seal parts 1e-1 and 1e-2 and the outer side of vertical seal part 1d become rounded (refer to FIG. 14).

According to the lateral seal device configured, as described above, such a problem can be prevented in which, when packaging bags with content come into contact with each other, the bags are damaged or pinholes are formed.

Although the present invention has been described showing some embodiments, as described above, it is needless to say that the invention of this application is not limited to these, and can be variously changed and carried out without departing from the scope of the technical idea.

REFERENCE SIGNS LIST

1 Cylindrical Film
1a Folding Part
1b Overlapping Part

1c Empty Portion
1d Vertical Seal Part
1e, 1e-1, and 1e-2 Lateral Seal Part
1f Sealant
2 Bag-making Guide
3A and 3B Vertical Seal Device
4A and 4B Guide Roller
5 Ironing Roller
6 Lateral Seal Device
61 and 62 Seal Bar
61a and 62a First Convex Portion
61b and 62b Second Convex Portion
61c and 62c Intermediate Portion
63a First Groove Portion
63b Second Groove Portion
64 Cutter
7 Injection Pipe for Liquid Content
8A and 8B Air Cylinder
9 Guide Plate
10A and 10B Tension Guide Roller Group
11 Tension Device
12 Pressing Part
13 Shaping Plate
14 Vacuum Pad
15 Bucket Conveyor
16 Injection Pipe for Solid Content
16a Fin
17 Outer Guide
17a Hole

The invention claimed is:

1. A vertical filling and packaging machine comprising:
a bag-making guide that forms a cylindrical film by folding a film, in a shape of a sheet, fed downwardly in a center of a width thereof to overlap width direction ends of the film with each other;
a vertical seal device that forms a vertical seal part by performing heat-sealing to a side of an overlapping part of the cylindrical film, or to each of a side of a folding part and the side of the overlapping part of the cylindrical film, said vertical seal device being disposed under said bag-making guide;
plural pairs of guide rollers that rotate sandwiching the side of the folding part and the side of the overlapping part of the cylindrical film fed downwardly;
a pair of ironing rollers that form an empty portion in the cylindrical film by rotating while sandwiching the cylindrical film in which content has been injected to feed the cylindrical film downwardly, said ironing rollers being disposed under said vertical seal device;
a lateral seal device that performs heat-sealing over a full width in a lateral direction of the empty portion of the cylindrical film to form a lateral seal part, and that cuts off the cylindrical film at the lateral seal part, said lateral seal device being disposed under said pair of ironing rollers;
a tension device that is disposed between said ironing rollers and said lateral seal device and that pulls both sides of the cylindrical film laterally outward in order to flatten a portion of the cylindrical film before said pair of ironing rollers sandwiches the portion of the cylindrical film, wherein the content has been injected into the cylindrical film, and wherein the tension device is disposed closer to said ironing rollers than said lateral seal device, and
injection means that injects content into the cylindrical film, said injection means having an outlet for the content provided above the position of said ironing rollers.

2. The vertical filling and packaging machine according to claim 1, comprising a second tension device that pulls both sides of the cylindrical film laterally outward while feeding the cylindrical film downwardly to remove sag of the cylindrical film, said second tension device being disposed above said ironing rollers and under a lower end of said vertical seal device.

3. The vertical filling and packaging machine according to claim 2, wherein said second tension device comprises a part of guide roller pairs of said plural pairs of guide rollers, and a tip of a rotational axis of each guide roller is directed obliquely downward in said some guide roller pairs.

4. The vertical filling and packaging machine according to claim 1, wherein
said injection means includes at least an injection pipe for injecting the content in a solid state, and an outlet of the injection pipe is located at a height of an upper end of said vertical seal device, and
the vertical filling and packaging machine further comprises:
a mechanism that expands an inside of the cylindrical film and secures an injection passage for the content only when the content in a solid state is injected into the cylindrical film from the injection pipe.

5. The vertical filling and packaging machine according to claim 4, wherein said mechanism that secures the injection passage for the content comprises:
a guide roller moving device that moves said plural pairs of guide rollers to an inside in a lateral direction of the cylindrical film so that a body of the cylindrical film sags; and a pair of vacuum pads that suction and pulls a front surface and a back surface of the body of the cylindrical film, wherein the inside of the cylindrical film is expanded and secures the injection passage for the content by pulling the front surface and the back surface of the body of the cylindrical film by said pair of vacuum pads while causing the body of the cylindrical film to sag by said guide roller moving device.

6. The vertical filling and packaging machine according to claim 1, wherein said injection means includes at least an injection pipe for injecting the content in a solid state, and an outlet of said injection pipe is located at a height of a lower end of said vertical seal device,
said injection pipe expands an inside of the cylindrical film while guiding the inside of the cylindrical film to secure an injection passage for the content, and
an outer guide is arranged outside said injection pipe with a certain space therebetween through which the cylindrical film passes.

7. The vertical filling and packaging machine according to claim 1, further comprising a pair of shaping plates arranged opposed to each other on a front surface and a back surface of the cylindrical film, respectively in a region between said ironing rollers and said lateral seal device, wherein said shaping plates sandwich a portion of the cylindrical film into which the content has been injected at a certain interval to restrict swelling of the portion, and thereby form a shape of the portion.

8. The vertical filling and packaging machine according to claim 1, further comprising a pair of guide plates arranged in a removable manner and opposed to each other at a certain interval through which the cylindrical film can pass in a region between said ironing rollers and the lower end of said vertical seal device.

9. The vertical filling and packaging machine according to claim 1, wherein said lateral seal device performs heat-sealing and cutting so that insides and outsides of corners of a packaging bag become rounded where the vertical seal part and the lateral seal part intersect with each other.

10. A method of manufacturing a packaging bag with content comprising the steps of:

forming a cylindrical film by folding a film, in a shape of a sheet, fed downwardly in a center of a width thereof to overlap width direction ends of the film with each other;

forming a vertical seal part by performing heat-sealing to a side of an overlapping part of the cylindrical film, or to each of a side of a folding part and the side of the overlapping part of the cylindrical film;

forming a first lateral seal part by performing heat-sealing over a full width in a lateral direction of the cylindrical film and cutting off the cylindrical film at a position of the lateral seal part;

injecting a predetermined amount of content into the cylindrical film;

forming an empty portion in the cylindrical film by rotating a pair of rollers while sandwiching the cylindrical film by the pair of rollers to feed the cylindrical film downwardly, wherein the content has been injected into the cylindrical film; and forming a second lateral seal part by performing heat-sealing over a full width in a lateral direction of the empty portion of the cylindrical film and cutting off the cylindrical film at the position of the lateral seal part, wherein both sides of the cylindrical film are pulled laterally outward to flatten a portion of the cylindrical film before the pair of rollers sandwiches the portion of the cylindrical film, wherein the content has been injected into the cylindrical film, and wherein both sides of the cylindrical film are pulled laterally outward between a position where the cylindrical film is sandwiched by the pair of rollers and a position where the second lateral seal is formed, and wherein the both sides of the cylindrical film are pulled at a position closer to the pair of rollers than the position where the second lateral seal is formed.

11. The method of manufacturing the packaging bag with content according to claim 10, wherein in the step of injecting the content, an inside of the cylindrical film is expanded and an injection passage for the content is secured only when the content in a solid state is injected into the cylindrical film.

12. The method of manufacturing the packaging bag with content according to claim 11, wherein the inside of the cylindrical film is expanded by moving both sides of the cylindrical film laterally inward to cause a body of the cylindrical film to sag, and by suctioning and pulling a front surface and a back surface of the body of the cylindrical film.

* * * * *